US007542553B2

(12) United States Patent
Gurfein et al.

(10) Patent No.: US 7,542,553 B2
(45) Date of Patent: Jun. 2, 2009

(54) INTERACTIVE VOICE COMMUNICATIONS NETWORK ENTERTAINMENT

(75) Inventors: Gedaliah Gurfein, Jerusalem, IL (US); Yaakov Kirschen, Herzeliya Pituach, IL (US); Jeremy Barkan, Jerusalem, IL (US); Shachar Hendel, Jerusalem, IL (US)

(73) Assignee: ZOW Ltd., Jerusalem (IL)

( * ) Notice: Subject to any disclaimer, the term of this patent is extended or adjusted under 35 U.S.C. 154(b) by 192 days.

(21) Appl. No.: 11/542,718

(22) Filed: Jul. 28, 2006

(65) Prior Publication Data

US 2008/0008297 A1 Jan. 10, 2008

Related U.S. Application Data

(63) Continuation of application No. 10/229,263, filed on Aug. 28, 2002, now abandoned.

(60) Provisional application No. 60/315,041, filed on Aug. 28, 2001.

(51) Int. Cl.
*H04M 11/00* (2006.01)

(52) U.S. Cl. .............. 379/88.18; 379/88.04; 379/88.16; 463/35

(58) Field of Classification Search .............. 379/88.18, 379/88.04, 88.16; 463/35
See application file for complete search history.

(56) References Cited

U.S. PATENT DOCUMENTS

| | | | | |
|---|---|---|---|---|
| 5,278,943 | A * | 1/1994 | Gasper et al. | 704/200 |
| 5,805,784 | A | 9/1998 | Crawford | |
| 5,810,599 | A * | 9/1998 | Bishop | 434/157 |
| 5,890,146 | A * | 3/1999 | Wavish et al. | 706/46 |
| 6,018,768 | A * | 1/2000 | Ullman et al. | 709/218 |
| 6,064,854 | A * | 5/2000 | Peters et al. | 434/308 |
| 6,193,610 | B1 | 2/2001 | Junkin | |
| 6,253,167 | B1 * | 6/2001 | Matsuda et al. | 703/11 |
| 6,409,599 | B1 * | 6/2002 | Sprout et al. | 463/31 |
| 6,554,707 | B1 | 4/2003 | Sinclair | |
| 6,819,759 | B1 * | 11/2004 | Khuc et al. | 379/309 |
| 6,874,029 | B2 | 3/2005 | Hutchenson | |
| 2002/0053089 | A1 | 5/2002 | Massey | |
| 2002/0061743 | A1 | 5/2002 | Hutcheson et al. | |
| 2002/0183072 | A1 | 12/2002 | Steinbach | |
| 2005/0169235 | A1 | 8/2005 | Hutcheson et al. | |

OTHER PUBLICATIONS

Robert St. Amant and R. Michael Young, Artificial Intelligence and Interactive Entertainment, Intelligence 12, pp. 17-19, Summer 2001.

(Continued)

*Primary Examiner*—Simon Sing
(74) *Attorney, Agent, or Firm*—Cahn & Samuels, LLP

(57) ABSTRACT

A method for operating a voice-based interactive entertainment program, the method including: a) receiving a voice communication from at least one user; b) selecting output in accordance with a voice-based interactive entertainment program, programmed with a plurality of interacting autonomous virtual performers; c) presenting the output to the user; d) prompting the user for input at a plot point of the voice-based interactive entertainment program; e) receiving the input from the user; f) selecting output at least partly in accordance with the voice-based interactive entertainment program and the input; and g) presenting to the user the output selected in step f).

42 Claims, 17 Drawing Sheets

OTHER PUBLICATIONS

Peter Wavish and David Connah, Virtual Actors that can perform scripts and improvised roles, International Conference on Autonomous Agents Proceedings of the First International Conference of Autonomous Agents, pp. 317-322, 1997.

Michael Mateas and Andrew Stern, Towards Integrating Plot and Character for Interactive Drama, Socially Intelligent Agents: The Human in the Loop, Papers from the AAAI Fall Symposium, Nov. 3-5, 2000.

Claudio S. Pinhanez and Aaron F. Bobick, "It/I" : a theater play featuring an autonomous computer graphics character, International Multimedia Conference Archive Proceedings of the Sixth ACM International Conference on Multimedia: Technologies for Interactive Movies, pp. 22-29, 1998.

Pattie Maes, Artificial Life Meets Entertainment: Lifelike Autonomous Agents, Communications of the ACM Archive, vol. 38, Iss. 11, pp. 108-114, Nov. 1995.

R. Michael Young, An Overview of the Mimesis Architecture: Integrating Intelligent Narrative Control into an Existing Gaming Environment, Artificial Intelligence and Interactive Entertainment Papers from 2001 AAAI Spring Symposium.

Michael Mateas, An OZ-Centric Review of Interactive Drama and Believable Agents, http://cs.cmu.edu/afs/cs/cmu.edu/project/oz/web/papers/CMU-CS-97-156-html, Jun. 1997.

Charles J. Petrie, Agent-based Engineering, the Web, and Intelligence, Stanford Center for Design Research IEEE Expert, Dec. 1996.

* cited by examiner

```
<gdml>
    <duration>
    <plotPoints>
        <plotPoint>
            <prompt>
                <grammars>
                    <grammar role>
                        <norecs>
                            <bubble reference>
                        </norecs>
                    </grammar>
                </grammars>
                <bubbleStrings>
                    <bubbleString role>
                        <bubble reference>
                    </bubbleString>
                </bubbleStrings>
            <prompt>
            <rules>
                <rule response transition>
            </rules>
        </plotPoint>
    </plotPoints>
    <transitions>
        <transition>
            <bubbleString>
                <bubble reference>
            </bubbleString>
        </transition>
    </transitions>
</gdml>
```

Fig. 2

INTERACTIVE VOICE COMMUNICATIONS NETWORK ENTERTAINMENT

CROSS REFERENCE TO RELATED APPLICATIONS

This application is a continuation application of U.S. patent application Ser. No. 10/229,263, filed Aug. 28, 2002; which is a non-provisional application which claims priority under 35 U.S.C. § 119(e) to U.S. Provisional Patent Application No. 60/315,041, filed on Aug. 28, 2001, titled "System and Method for Enabling Telephone and Network Based Entertainment and Commerce," incorporated herein by reference in its entirety.

FIELD OF THE INVENTION

The present invention relates to interactive entertainment systems in general, and more particularly to interactive entertainment over voice communications networks.

BACKGROUND OF THE INVENTION

While the telephone today is used for point-to-point communications and voice transmission, telephone companies and content providers are looking for ways to use the telephone as a platform for mass media entertainment. The popularity of radio shows of the 1930s, 40s, and 50s, and television shows then and now, ought to provide a natural model for telephone-based entertainment, but this has not been the case. Part of the problem lies in the nature of radio and television shows as historically being non-interactive media, whereas telephones are interactive devices by nature.

SUMMARY OF THE INVENTION

The present invention discloses a system and methodology for the creation, delivery and operation of voice-based interactive and conversational entertainment over voice networks, such as the telephone network.

In once aspect of the present invention a method is provided for operating a telephone entertainment program, the method including a) receiving a voice communication from at least one caller, b) selecting audio output in accordance with an audio entertainment program, c) presenting the audio output to the caller, d) prompting the caller for input at a plot point of the audio entertainment program, e) receiving the input from the caller, f) selecting audio output at least partly in accordance with the audio entertainment program and the input, and g) presenting to the caller the audio output selected in step f).

In another aspect of the present invention the method further includes performing steps d) through g) a plurality of times for a plurality of plot points of the audio entertainment program. A method according to claim 1 where the selecting step f) includes applying decision logic to the input thereby determining a state of the audio entertainment program, and selecting the audio output at least in part according to a predetermined association with the state.

In another aspect of the present invention any of the receiving steps includes receiving audio input.

In another aspect of the present invention any of the receiving steps includes receiving text-based input.

In another aspect of the present invention any of the selecting and presenting steps includes selecting and presenting text-based input.

In another aspect of the present invention the method further includes maintaining a history of the caller inputs, and where the selecting step f) includes selecting at least in part in accordance with the history.

In another aspect of the present invention the method further includes operating a plurality of virtual performers, and where any of the selecting steps includes any of the virtual performers determining a state of the audio entertainment program and selecting at least part of the audio output according to a predetermined association with the state.

In another aspect of the present invention the method further includes operating a game simulation engine operative to apply decision logic to the input, thereby determining a state of the audio entertainment program, and select the audio output at least in part according to a predetermined association with the state.

In another aspect of the present invention the operating step includes applying the decision logic in accordance with a rule structure of a game.

In another aspect of the present invention the operating step includes applying the decision logic in accordance with a predetermined outcome probability.

In another aspect of the present invention the method further includes conducting the audio entertainment program for each of a plurality of callers, recording a history of the interaction of each of the callers with the audio entertainment program, and providing access to the histories to any of the callers.

In another aspect of the present invention the method further includes ranking the callers according to a characteristic of the caller's interaction with the audio entertainment program.

In another aspect of the present invention any of the steps are performed for a plurality of callers within the context of the audio entertainment program.

In another aspect of the present invention a method is provided for constructing phrases from pre-recorded variants of speech elements, the method including a) selecting a pre-recorded variant of a first speech element from a group of pre-recorded variants of the first speech element, b) selecting a pre-recorded variant of a second speech element from a group of pre-recorded variants of the second speech element, and c) constructing a phrase from the selected variants.

In another aspect of the present invention the selecting step b) includes selecting where the second speech element associatively follows the first speech element.

In another aspect of the present invention any of the selecting steps includes selecting any of the variants at least in part according to a predetermined association with a relationship between a virtual performer and a caller.

In another aspect of the present invention a virtual theater architecture is provided including virtual performer means operative to play the role of a specific character in a telephone show, stage manager means operative to interpret a flow script of the telephone show and send messages to the virtual performer means, each of the messages being a directive of the flow script, and stage means operative to maintain state information of the telephone show and receive behavior exhibited by the virtual performer means responsive to receipt of any of the messages.

In another aspect of the present invention the architecture further includes a set of behavior rules, and a behavior history, and where the virtual performer means is operative to determines its own behavior by applying the behavior rules to any of the state information, the incoming messages, and the behavior history.

In another aspect of the present invention a telephone entertainment system is provided including a telephony interface operative to interface with a caller, speech/voice processing means operative to interface with the telephony interface receive input from the caller, presentation means operative to interface with the speech/voice processing means and prepare output at least partly based on the input, and a game engine operative to interface with the presentation means and operate at least one virtual performer in accordance with a flow script, thereby providing an output directive to the presentation means for use in preparing the output.

In another aspect of the present invention a telephone entertainment system is provided including a telephony interface operative to interface with a caller, speech/voice processing means operative to interface with the telephony interface and including a speech processor operative to perform automatic speech recognition on speech input received from the caller, a template module for facilitating input and output via templates, an audio playout module for producing audio output to the caller, presentation means operative to interface with the speech/voice processing means and including means for preparing flow script bubbles for output via the audio playout module, means for maintaining call state information, means for populating pre-defined templates with links to audio content in predetermined association with the bubbles and the call state, a game engine operative to interface with the presentation means and including means for processing a flow script, means for operating software agents representing virtual performers in accordance with the flow script, and data storage means accessible to the game engine for storing and retrieving any of game variables, user profile information, statistics, language models and behavior information in association with the processing of the flow script.

In another aspect of the present invention a method is provided for processing user input into an interactive telephony application architecture, the method including submitting a request to a controller, the request representing interpreted input from a user, the controller retrieving information from a presentation layer relevant to the input and popping a session context from a presentation layer stack, retrieving a list of post-tasks of a previous action and performing the post-tasks, pushing a new session context onto the presentation layer stack, retrieving a list of pre-tasks, performing the pre-tasks, and rendering output via a scripted template subsequent to performing any of the tasks.

In another aspect of the present invention a flow script for an audio entertainment program is provided, the flow script including a plurality of plot points, a plurality of transitions between the plot points, a plurality of rules for determining movement between the plot points and the transitions, and a plurality of output directives associated with any of the plot points and the transitions.

In another aspect of the present invention the flow script further includes a plurality of messages for delegating to a plurality of virtual performers responsibility for determining actual output based on any of the output directives.

In another aspect of the present invention the flow script further includes a plurality of rules for determining movement between the plot points and the transitions based on caller input.

In another aspect of the present invention the flow script further includes a grammar for interpreting the caller input.

In another aspect of the present invention a telephone entertainment system is provided including a) means for receiving a voice communication from at least one caller, b) means for selecting audio output in accordance with an audio entertainment program, c) means for presenting the audio output to the caller, d) means for prompting the caller for input at a plot point of the audio entertainment program, e) means for receiving the input from the caller, f) means for selecting audio output at least partly in accordance with the audio entertainment program and the input, and g) means for presenting to the caller the audio output selected in step f).

In another aspect of the present invention the means for selecting f) includes means for applying decision logic to the input, thereby determining a state of the audio entertainment program, and means for selecting the audio output at least in part according to a predetermined association with the state.

In another aspect of the present invention any of the means for receiving are operative to receive audio input.

In another aspect of the present invention any of the means for receiving are operative to receive text-based input.

In another aspect of the present invention any of the means for selecting and presenting are operative to select and present text-based input.

In another aspect of the present invention the system further includes means for maintaining a history of the caller inputs, and where the means for selecting f) is operative to select at least in part in accordance with the history.

In another aspect of the present invention the system further includes a plurality of virtual performers operative to determine a state of the audio entertainment program and select at least part of the audio output according to a predetermined association with the state.

In another aspect of the present invention the system further includes a game simulation engine operative to apply decision logic to the input, thereby determining a state of the audio entertainment program, and select the audio output at least in part according to a predetermined association with the state.

In another aspect of the present invention the game engine is operative to apply the decision logic in accordance with a rule structure of a game.

In another aspect of the present invention the game engine is operative to apply the decision logic in accordance with a predetermined outcome probability.

In another aspect of the present invention the system further includes means for conducting the audio entertainment program for each of a plurality of callers, means for recording a history of the interaction of each of the callers with the audio entertainment program, and means for providing access to the histories to any of the callers.

In another aspect of the present invention the system further includes means for ranking the callers according to a characteristic of the caller's interaction with the audio entertainment program.

In another aspect of the present invention any of the means are operative for a plurality of callers within the context of the audio entertainment program.

In another aspect of the present invention a phrase construction architecture is provided including a first group of pre-recorded variants of speech elements, and a second group of pre-recorded variants of speech elements, where the second group associatively follows the first group.

In another aspect of the present invention a virtual theater method is provided including operating at least one virtual performer operative to play the role of a specific character in a telephone show, interpreting a flow script of the telephone show and send messages to the virtual performers, each of the messages being a directive of the flow script, and maintaining state information of the telephone show responsive to behavior exhibited by the virtual performers responsive to receipt of any of the messages.

In another aspect of the present invention the operating step includes applying behavior rules of the virtual performer to any of the state information, the incoming messages, and a behavior history for the virtual performer.

It is appreciated throughout the specification and claims that references to telephones, telephone shows, telephone programs, and telephone networks may be understood within the context of any system capable of conveying audio media, such as, for example, voice-over-IP (VoIP) systems, packet-based telephony systems such those specified by GPRS, 3G and UMTS and are not limited to existing telephone-based systems.

BRIEF DESCRIPTION OF THE DRAWINGS

The present invention will be understood and appreciated more fully from the following detailed description taken in conjunction with the appended drawings in which:

FIG. 2 is a simplified illustration of a flow script structure, constructed and operative in accordance with a preferred embodiment of the present invention;

DETAILED DESCRIPTION OF PREFERRED EMBODIMENTS

Figure 1:
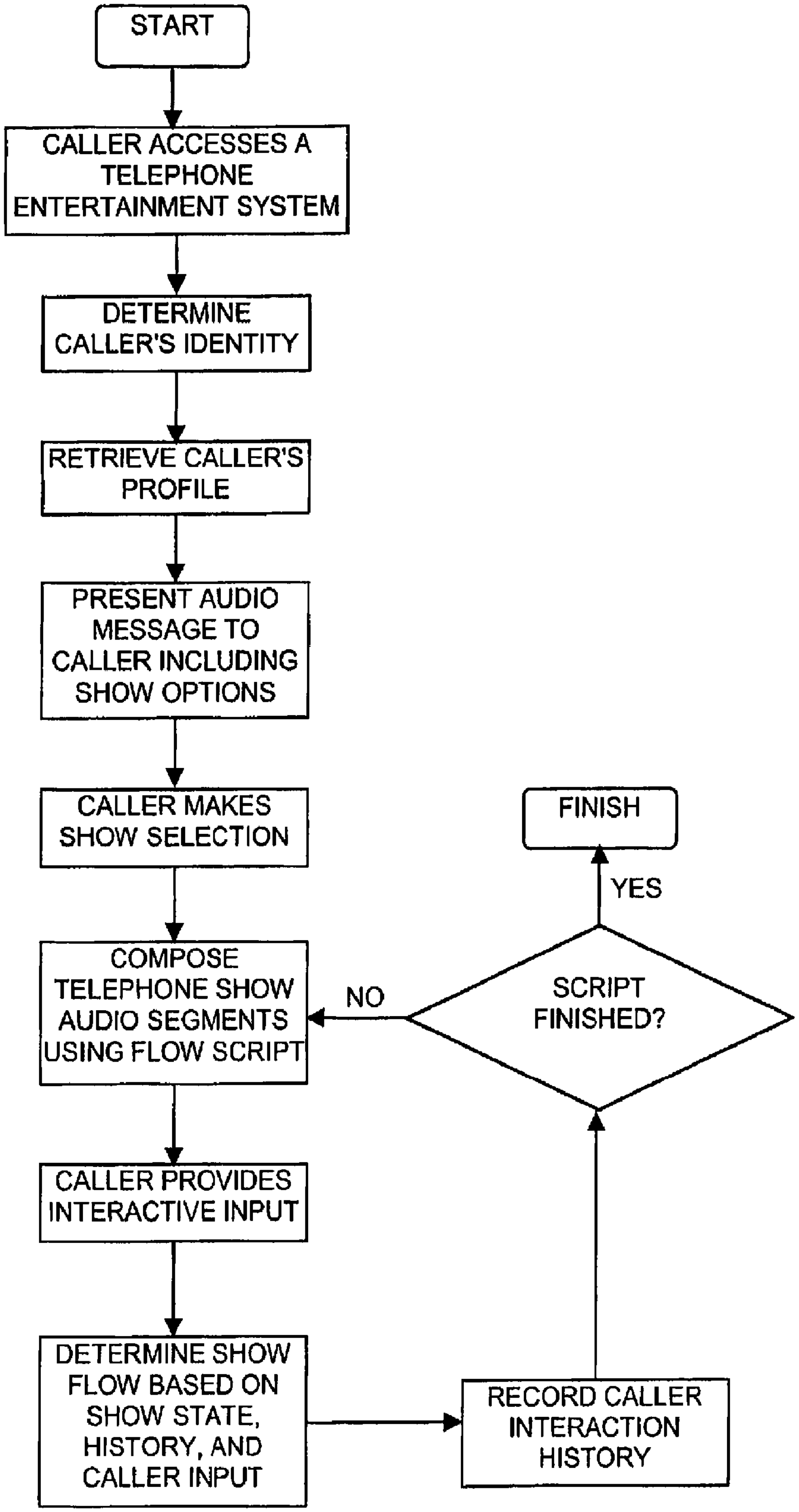
FIG. 1 is a simplified flowchart illustration of a method for operating a telephone entertainment program, operative in accordance with a preferred embodiment of the present invention.

Reference is now made to FIG. 1, which is a simplified flowchart illustration of a method for operating a telephone entertainment program, operative in accordance with a preferred embodiment of the present invention. In the method of FIG. 1 a caller accesses a telephone entertainment system using a voice communications network, such as the telephone network. A preferred implementation of a telephone entertainment system is described in greater detail hereinbelow with reference to FIGS. 6 and 7. The system then answers the call through a voice network interface. The caller's identity is then ascertained, such as by using Caller ID and/or having the caller enter a PIN number. The system then retrieves the caller's profile, where a profile has been previously established for the caller, and a list of audio entertainment programs, herein referred to as telephone shows, that would be appropriate for the caller based on the caller's profile. The system then presents the user with an audio message, typically including a personalized greeting, with a suggestion of possible shows that the caller may choose from. The user then responds, typically by voice, requesting one of the options.

The system typically maintains pre-recorded audio segments, such as sound effects, music, audience responses, speech, etc., pre-defined speech recognition grammar definitions, and script segments, in addition to maintaining the caller's profile and history of system usage. When a telephone show is selected, the system then composes the telephone show's audio content using the show's flow script, associated audio segments and grammars, and the user profile and history. A preferred implementation of a flow script is described in greater detail hereinbelow with reference to FIG. 2.

The system then plays the audio content, and listens to the caller's spoken words or other input, using the responses to affect the progress and development of the content of the show. The flow of the script is navigated based on the sequence of caller responses. The system may create dynamic plots built by piecing together script segments based on decisions made at decision or branching points within the script. The result is a unique show that is the product of the interaction between the script segments and the caller's input.

Several callers can participate together in a single telephone show, where each caller assumes a different role. The dynamic plot of a such a show is thus determined by the combined decisions of the callers. The callers can be aware of each other's identity, such as where a caller invites a friend to participate in the show. A preferred method of managing multi-user shows is described in greater detail hereinbelow with reference to FIGS. 11 and 12.

The telephone entertainment system may employ non-audio input and output media for use within the context of a telephone show, such as the text-based input of SMS or MMS messaging, which may be used to send show updates, information, and invitations to callers. Callers may also send such messages to the system.

The system preferably records the history of a caller's participation. This information enables the system to respond in the future based on the caller's previous behavior. The history may also serve as the basis for market research, targeted advertising, and future telephone shows.

One exemplary operational scenario of the method of FIG. 1 may be illustrated within the context of a humorous quiz show, in which characters, such as the characters of the television show The Simpsons®, interact within a game show environment having comic elements. In this scenario the caller plays the role of a contestant interacting with any of six characters on the show. Four are the Simpson family members, a fifth is the announcer, and the sixth is the studio audience. Six "virtual performers" play these six roles in what is referred to herein as a "virtual theater." A preferred method of implementing a virtual theater is described in greater detail hereinbelow with reference to FIG. 5.

The show opens with a theme song and an announcer who then introduces the show and its host, Bart Simpson. Bart then welcomes the contestant (the Caller). Bart introduces his panel of expert questioners: Marge (his mom), Homer (his dad), and Lisa (his sister). Bart then asks the first questioner to ask the first question. Bart is pre-programmed with a certain probability to offer a quip about the questioner, while one or more of the questioners are pre-programmed with a certain probability to respond to Bart's quip. Other pre-programmed possibilities may, for example, enable the questioners and Bart to get into funny arguments. The questioners can react with good humor or they can become insulted and defensive in keeping with their pre-programmed personality traits. The audience "hears" the banter and reacts appropriately, such as with catcalls, cheering, laughter, etc. Bart calls the group to order, gets the show back on track, and the questioner asks a question. The caller responds to the questions with verbal answers.

Another exemplary operational scenario of the method of FIG. 1 may be illustrated within the context of a baseball game simulation. In this scenario it's the World Series during a tie-breaking game, with the caller's team leading 1-0. It's the bottom of the ninth inning, two outs, bases loaded, and the caller is the pitcher. If the caller strikes the batter out, the caller's team wins. The caller hears the screams of the crowd, while a sportscaster describes the scene.

The telephone entertainment system maintains the statistics of the teams and players, as well as the rules of the game. The system consults its database, makes various game-play decisions, and creates game events. The batter typically represents a real-world baseball personality that is implemented as a virtual performer. The batter typically has a high degree of behavioral autonomy, limited only by the need to remain consistent with the stored facts about the real-world batter that he represents. Other virtual performers play the parts of the sportscaster and the crowd, pre-programmed to observe and react to the game as they "see" it. The caller wins the game by learning the strategy of the opposing batters as play progresses, and by choosing the correct pitches to strike opposing batters out. The caller uses voice commands to select the pitch type (e.g., fast ball, curve ball, change-up, slider) and location (e.g., high, middle, low, inside, center, outside), with the system carrying out the pitch and applying appropriate game rules and probabilities.

The telephone show flow may be illustrated as follows.

1. The caller picks the team he'll pitch against.
2. The system then selects the lineup of batters.
3. The system then:
   a. Decides who's next up to bat.
   b. Sends the batter to the plate.
4. The Sportscaster describes the scene:
   a. Announces the batter's name
   b. Describes his approach to the plate.
   c. Describes the mood of the crowd.
   d. Emphasizes the tension of the moment.
   e. Gives background "color" commentary about the batter.
5. The crowd reacts to the scene.
6. The caller calls for a specific pitch, possibly including location or other control elements.
7. The system decides:
   a. How accurate the pitch is.
   b. Whether the pitch is in the strike zone or not.
   c. If not, whether the pitch is inside, outside, high, or low.
   d. What this particular batter is likely to do based on the stored real-life statistics for this particular batter.
   e. Based on 7a and 7b the system creates the appropriate game event representing the outcome of the pitch.
8. The Sportscaster reports on the event, which the system has created, using information stored in the statistics to add color commentary.
9. The crowd reacts to the event.

If another batter is needed then control returns to Step 3.

Another exemplary operational scenario of the method of FIG. 1 may be illustrated within the context of a soccer game simulation. In this scenario it's the final minutes of a crucial cup game between two rival teams, Manchester United and Arsenal, and the score is tied at 0-0. The caller must pass and maneuver the ball across the field to a scoring position, shoot, and score in order to win. The callers wins the game by learning the strategy of the opponent as play progresses, and by choosing the correct moves to avoid being blocked and to score.

The system maintains a description of the scoring probabilities at the key points on the field. The caller controls his team both on offense and on defense. On offense, the caller can choose to move the ball right, left, ahead, or back, depending on the prompted choices for the current position on the field, or shoot. The opponent team is played by the system as a Non-Player Character (NPC), and implements a strategy of anticipating the caller's commands. If the NPC correctly anticipates the caller's command, the play is blocked and the participant can lose possession of the ball. When on defense, the caller chooses the anticipated move of the ball by the offensive NPC. If the caller correctly anticipates the NPC's choice, the play is blocked and the participant can gain possession of the ball. The caller selects his move using voice commands.

Game time is kept by the system. The caller wins the game by leading at the end of game time, as in an actual soccer game. If there is a tie, the participant can choose to continue to play in sudden death overtime.

The telephone show flow may be illustrated as follows.

1. The team's coach greets the caller.
2. The coach explains that the game against the opponent team is in the last few minutes of play and that the caller's help is needed to win the game.
3. An NPC will play the part of the opponent.
4. The Sportscaster begins the play-by-play coverage of the game in progress.

5. After a few exciting moments of play, the action freezes at a decision point. This is a point where a player needs to make a critical decision, such as which way to pass the ball.
6. If, at this decision point, the caller's team has the ball, the caller will step into the part of the player with the ball and choose which way to pass. The caller makes his choice verbally, such as by saying "left" or "ahead" if the choices offered were to pass left or to pass ahead.
7. If, at this decision point, the opponent team is in possession, the caller attempts to outthink the opponent and block him by predicting which movement or action the opponent will choose.
8. The caller then hears of the success or failure of his action as described by the sportscaster.
9. At any decision point the player with the ball can, in addition to passing the ball, choose to shoot. Success is based on the system's analysis of the shooter's identity and distance from the net.
10. When a goal is made, the sportscaster announces the score.
11. Actual play time is recorded by the system. When the clock runs out, the referee blows his whistle and the sportscaster announces the end of the game.

The soccer game scenario may be further adapted to allow two callers to play the game at the same time, with each caller controlling a different team. As the system plays a script segment, both players hear that segment. When a decision point is reached, each caller is prompted separately for his/her decision what to do next. Preferably, neither caller hears the voice of the other caller. The system receives the two responses and selects the next script segment, playing the appropriate audio for the determined outcome event, which is heard by both players. Where the callers speak in different languages, they may respond and hear audio segments in their respective tongues. The game may be part of a simulated soccer league in which different callers would represent different teams which are determined by a virtual or real league. The callers may then be ranked in league standings based on their performance in the games.

Another exemplary operational scenario of the method of FIG. 1 may be illustrated within the context of a virtual world simulation. In this scenario the caller is on a river in a virtual world of intertwining rivers. A virtual performer guide is provided who is pre-programmed with knowledge about the kinds of flora, fauna, and local tribesman that the caller is likely to encounter, but the guide is not familiar with the maze of intertwining rivers. Each time the caller explores a new bend in the river, by providing a verbal command in response to a prompt to provide a direction in which to move along the river, the guide describes what he "sees". The guide is also capable of remembering where the caller has been in order to return to previously visited points. The stretches of river between decision points requiring caller input may be used to play distinctive sounds and audio background, which may differ for different points along the river. With repeated visits to the virtual world simulation, the caller can learn to navigate the maze of rivers. This experience may also be provided for several callers simultaneously, providing the callers the possibility of collaborating and cooperating.

Another exemplary operational scenario of the method of FIG. 1 may be illustrated within the context of a virtual world simulation based on the Harry Potter™ novels. In this scenario the caller assumes the role of a student at Hogwarts, the school for wizards in a magic castle. The caller then is set out on a quest, and meets characters and creatures familiar to them from the Harry Potter™ story. The caller moves through a series of interconnected paths that lead out from Hogwarts to four areas. A different type of magical creature, such as Pixies, Banshees, Gnomes and Trolls, populates each area. The caller's task is to obtain the trophy found at the end of one of the paths, and return it to Hogwarts. The caller navigates by giving voice commands when prompted, indicating a desired direction of movement.

Reference is now made to FIG. 2, which is a simplified illustration of a flow script structure, operative in accordance with a preferred embodiment of the present invention. A flow script is used to describe the flow of the telephone show and descript what kinds of things may happen during the show. The flow script structure of FIG. 2 is designed to include multiple script segments that may be selectably carried out in various combinations. The flow script specifies interactive decision points called "plot points" that may branch into for multiple script segments. A flow script may be used to implement a plot point model including key plot points of dramatic and interactive tension, and the transitions between them. The plot points present opportunities for the caller's interaction, and enable the caller to determine the flow of the show.

The flow script structure of FIG. 2 employs a tag-based syntax that is comparable in style to the tag-based syntax used in the Extended Markup Language (XML). An example of this flow script structure is a syntax referred to herein as Game Definition Makeup Language (GDML) The elements of the flow script structure of FIG. 2 include:

Bubble: A bubble represents something that is said by a character in the show. Examples of bubbles are: "Sportscaster: 'Nimni passes to the right!'", or "Coach: 'Now you may choose to pass left or right'". The specification of a bubble may reference a specific bubble file.

A Bubble Class is a set of bubbles describing the same semantic idea, but with various alternatives, such as by using "flexible speech," described in greater detail hereinbelow with reference to FIGS. 3 and 4. When a bubble class is specified for presentation, one of the bubbles belonging to the bubble class will be presented. An example of two bubbles which can belong to the same bubble class: "Maccabi indeed came ready for this game" and "What a performance by Maccabi".

A Bubble Class is specified similarly to a Bubble using the Bubble tag, but references a folder or directory that contains a set of Bubbles.

Bubble String: A sequence of bubbles that forms a segment of the script. The bubbles in a bubble string are played one after the other with no pauses in between. Some or all of the bubbles in a bubble string can be defined as bubble classes.

Context: The context specifies the dynamic context of the Bubble or BubbleClass. One example would be in Sports-based telephone shows, where the same transition is described for different teams. By specifying the dynamic context to be the current Offensive team, the Bubbles and BubbleClasses may be selected dynamically based on the current teams playing. This enables the GDML specification to be generalized for a particular format, genre, or show, without requiring specific content to be specified. For example, the description of a transition could be specified based on the context of the current attacking team on Offense, and the resulting Defensive maneuver that leads up to the PlotPoint would be specified based on the current team on Defense. Bubbles and BubbleStrings need to be provided for each context. For example, for each team in the Soccer league, Bubbles and BubbleClass would be provided for every specification where a context is specified that is team specific.

Role: The caller may have a dynamic or static role in the show. An example of a dynamic role would be in a Sports-based telephone show where a caller's team may move between offensive and defensive rolls. Based on the role of the user in the show, different BubbleStrings and Grammars will be appropriate. The Role tag provides the role assignment for BubbleStrings and Grammars. BubbleStrings that describe a PlotPoint decision and a Grammar defining the caller's choices would be different if the caller's role is currently Offense or Defense. The role may also be both, with a BubbleString being specified for all caller roles.

Transition: A Transition specifies the segment of the game which leads from one plot point to another. The body of the Transition definition is comprised of BubbleStrings.

PlotPoint: A PlotPoint specifies the point of user interaction, i.e. a decision point. The specification of the Plot Point includes the specification of the prompts and the transition rule.

Prompts: The prompts specify the user interaction at the plot points. This specification includes the Grammars which determine the interpretation of user input and the BubbleStrings which the caller hears.

Grammars: The grammars specify the natural language interpretation of the caller response by referencing a grammar specification. Examples of such grammars include a Speech Recognition Grammar Specification or an n-Gram Language Specification as defined by the W3C. The Grammar tag also specifies how to prompt the caller where there is no recognized input.

Rules: The rules specify what action should be taken based on the user decision. This is specified by defining the decision input of all the roles at the PlotPoint, such as the decisions by offense and defense in a Soccer game, and the resulting transition. Rules can also specify domain-specific methods for state evaluation. An example of this kind of rule would be in a baseball show, where the result of a caller selection of a pitch is determined both by the pitch as well as the game state, team statistics, and a simulation model of baseball. A baseball state machine component is used by the rule to determine the outcome and effect the selection of the resulting plot point by the rule.

The flow script defines the bubbles, bubble classes and bubble strings at the plot points, the interaction and dialog, and the set of transitions that may result depending on the caller's responses. It also defines the bubble strings that make up the transitions. By convention, the starting point of the flow script is a special plot point referred to as the "null" plot point. This plot point specifies the "bootstrap" transition that begins the show.

For example, in the Soccer Telephone Show, when a plot point is reached, a caller is presented with a choice by the coach of his team, in response to which the caller makes a decision that affects the course of the game. This results in the next transition bubble string being output to the caller. This transition describes what happened on the field as a result of the caller's choice at the plot point, indicating, for example, whether the shot was blocked or whether possession of the ball was lost.

The following is a sample GDML flow script for a simple Soccer Telephone Show. It shows the various plot points and transitions, as well as soccer-specific concepts such as offensive and defensive roles.

```
<gdml>
    <!                              Set Duration                >
<duration seconds="150"/>
    <plotPoints>
    <!                              Plot Points                 >
<plotPoint name="nullPlp" special="null">
            <rules>
                <rule transition="initialTr"/>
            </rules>
        </plotPoint>
        <plotPoint name="01Plp" scoringFactor="5">
            <grammars>
                <grammar role="offense" reference="soccer">
                    <norecs>
                        <bubble reference="01PlpOfNoRec3" context="offense"/>
                    </norecs>
                </grammar>
                <grammar role="defense" reference="soccer">
                    <norecs>
                        <bubble reference="01PlpDfNoRec1" context="defense"/>
                        <bubble reference="01PlpDfNoRec2" context="defense"/>
                        <bubble reference="01PlpDfNoRec3" context="defense"/>
                    </norecs>
                </grammar>
            </grammars>
            <bubbleStrings>
                <bubbleString role="both">
                    <bubble reference="At01" context="offense"/>
                </bubbleString>
                <bubbleString role="offense">
                    <bubble reference="01PlpOf" context="offense"/>
                </bubbleString>
                <bubbleString role="defense">
                    <bubble reference="01PlpDf" context="defense"/>
                </bubbleString>
```

-continued

```
            </bubbleStrings>
            <rules>
                    <rule offense="left" defense="right" transition="01to05Tr"/>
                    <rule offense="right" defense="left" transition="01to06Tr"/>
                    <rule offense="right" defense="right"
transition="01to06TrR09"/>
                    <rule offense="left" defense="left"
transition="01to05TrR10"/>
                    <rule shot="good" transition="01ShGl10"/>
                    <rule shot="bad" transition="01ShBd10"/>
            </rules>
        </plotPoint>
    <transitions>
        <transition name="01to05Tr" starting="01Plp" ending="05Plp"
cop="false" changesScore="false">
            <bubbleString role="offense">
                    <bubble reference="VoOfLTr" context="general"/>
            </bubbleString>
            <bubbleString role="defense">
                    <bubble reference="VoDfRlTr" context="general"/>
            </bubbleString>
            <bubbleString role="both">
                    <bubble reference="01to05Tr" context="offense"/>
            </bubbleString>
        </transition>
        <transition name="01to05TrR10" starting="01Plp" ending="10Plp"
cop="true" changesScore="false">
            <bubbleString role="offense">
                    <bubble reference="VoOfLTrR" context="general"/>
            </bubbleString>
            <bubbleString role="defense">
                    <bubble reference="VoDfLlTrR" context="general"/>
            </bubbleString>
            <bubbleString role="both">
                    <bubble reference="01to05TrR10" context="offense"/>
            </bubbleString>
        </transition>
        <transition name="01to06Tr" starting="01Plp" ending="06Plp"
cop="false" changesScore="false">
            <bubbleString role="offense">
                    <bubble reference="VoOfRTr" context="general"/>
            </bubbleString>
            <bubbleString role="defense">
                    <bubble reference="VoDfLrTr" context="general"/>
            </bubbleString>
            <bubbleString role="both">
                    <bubble reference="01to06Tr" context="offense"/>
            </bubbleString>
        </transition>
        <transition name="01to06TrR09" starting="01Plp" ending="09Plp"
cop="true" changesScore="false">
            <bubbleString role="offense">
                    <bubble reference="VoOfRTrR" context="general"/>
            </bubbleString>
            <bubbleString role="defense">
                    <bubble reference="VoDfRrTrR" context="general"/>
            </bubbleString>
            <bubbleString role="both">
                    <bubble reference="01to06TrR09" context="offense"/>
            </bubbleString>
        </transition>
    <!                          End Shoot Goals             >
    <!                          Beginnings & Endings            >
    <!                          Beginnings          >
        <transition name="initialTr" starting="nullPlp" ending="01Plp"
cop="false" changesScore="false">
            <bubbleString role="both">
                    <bubble reference="Nullto01" context="defense"/>
            </bubbleString>
        </transition>
    <!                          Endings         >
    <!                          Non-tie Ending          >
        <transition name="endingDefeat" starting="endingPlp"
ending="finalPlp" cop="false" changesScore="false">
                    <bubbleString role="both">
                        <bubble reference="SportsEnd" context="general"/>
                        <bubble reference="SportsWinner" context="winning"/>
                        <bubble reference="name" context="winning"/>
                        <bubble reference="%v:winnerScore%" context="general"/>
```

-continued

```
                    <bubble reference="name" context="losing"/>
                    <bubble reference="to%v:loserScore%" context="general"/>
                </bubbleString>
                <bubbleString role="winning">
                    <bubble reference="CoachWin" context="winning"/>
                </bubbleString>
                <bubbleString role="losing">
                    <bubble reference="CoachLost" context="losing"/>
                </bubbleString>
            </transition>
    <!                          Tie Ending                >
        <transition name="endingTie" starting="endingPlp"
ending="finalPlp" cop="false" changesScore="false">
                <bubbleString role="both">
                    <bubble reference="SportsEnd" context="general"/>
                    <bubble reference="SportsTie" context="general"/>
                    <bubble reference="name" context="winning"/>
                    <bubble reference="%v:winnerScore%" context="general"/>
                    <bubble reference="name" context="losing"/>
                    <bubble reference="to%v:loserScore%" context="general"/>
                </bubbleString>
                <bubbleString role="winning">
                    <bubble reference="CoachTie" context="winning"/>
                </bubbleString>
                <bubbleString role="losing">
                    <bubble reference="CoachTie" context-"losing"/>
                </bubbleString>
        </transition>
    <!                          END of Beginnings & Endings                >
        </transitions>
</gdml>
```

The GDML flow script above provides the bubbles and bubble strings required for the various game and caller roles. For example, if the caller's team is currently on defense, the defense bubble string is used. Whereas if the role specified for the bubble string is "both", the bubble string may be used when the caller's team is in either an Offense or Defense role.

Figure 3:
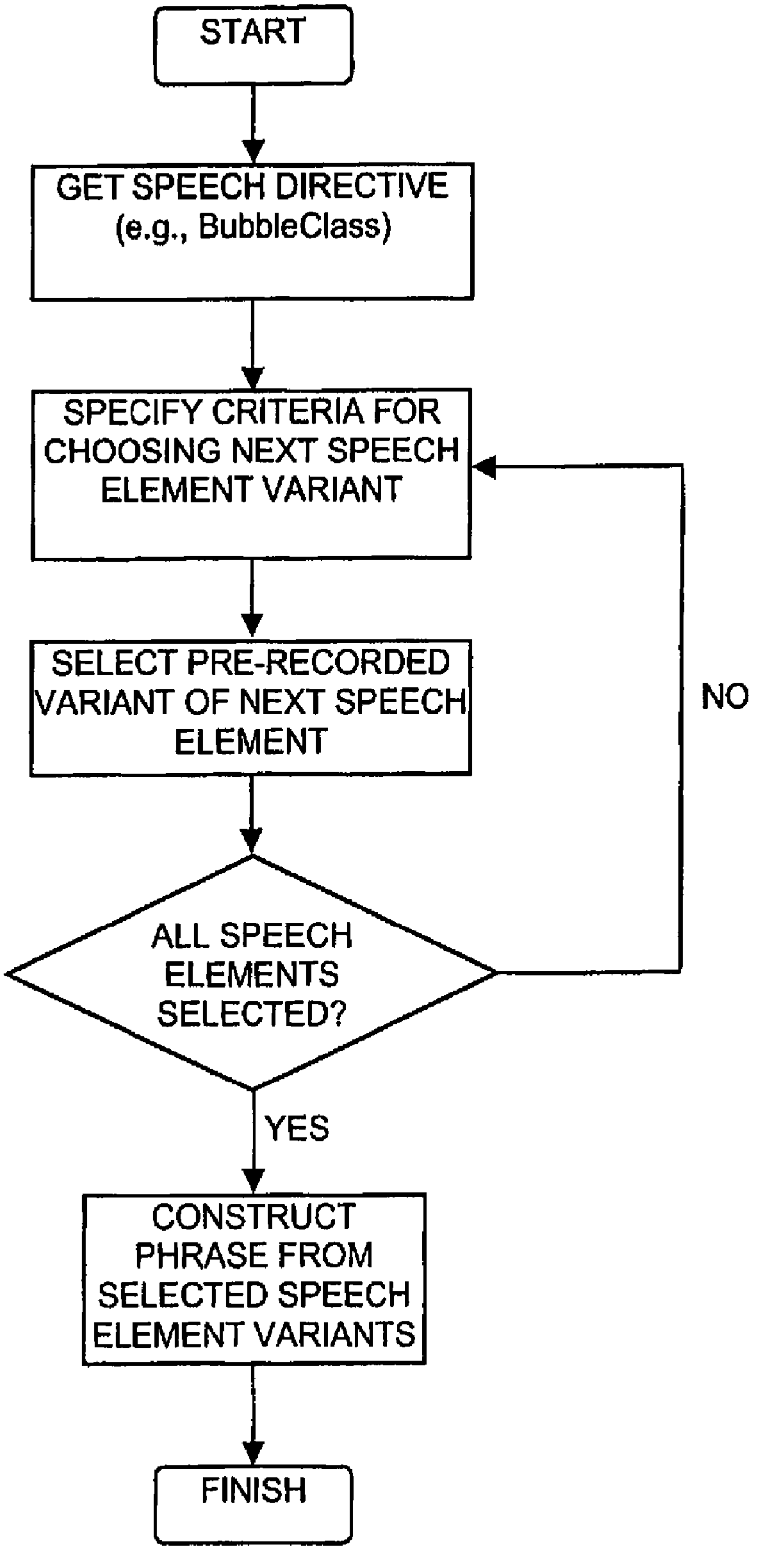
FIG. 3 is a simplified flowchart illustration a method of implementing flexible speech, operative in accordance with a preferred embodiment of the present invention.

Reference is now made to FIG. 3, which is a simplified flowchart illustration a method of implementing flexible speech, operative in accordance with a preferred embodiment of the present invention. As was described hereinabove with reference to FIG. 2, the flow script of the present invention provides semantic directions rather than specific lines of speech. To carry out flow script speech directives, flexible speech may be used where a single conversational element, such as a greeting, is expressed in a variety of ways and individually recorded, and then the individual recordings are provided for use by a virtual performer. An example of such a speech directive is in the form of a Bubble Class. The virtual performer then joins together multiple pre-recorded elements to form sentences.

Thus, for example, the following pre-recorded versions may be made to express a greeting: "Hi there!", "Hi!", "Hello", What's up?", "How's by you?", "How've you been?", "Long time no see", "Hi there stranger", "Hi, What've you been up to?", "How are you?", "How are you feeling?", "You're looking good, I hope you're feeling better.", "Hi, I was sorry to hear that you were sick . . . " Each pre-recorded greeting variant may also be recorded multiple times with different types of expression. Thus, the single greeting "How've you been?"may be recorded in a happy voice, an angry voice, a sullen voice, a timid voice, and a suspicious voice.

In one implementation of flexible speech, a caller history may be maintained for each virtual performer indicating the type of relationship the virtual performer has with each caller, such as friendly or adversarial. Based on this history the virtual performer may decide on the appropriate type of greeting to use when he next encounters the caller, selecting a greeting that is appropriate for both the current script context as well as the current state of the relationship.

In another implementation of flexible speech, a virtual performer selects a mode of behavior at random or in pre-association with various flow script states, and selects appropriate speech elements that are associated with the selected mode of behavior.

Figure 4:
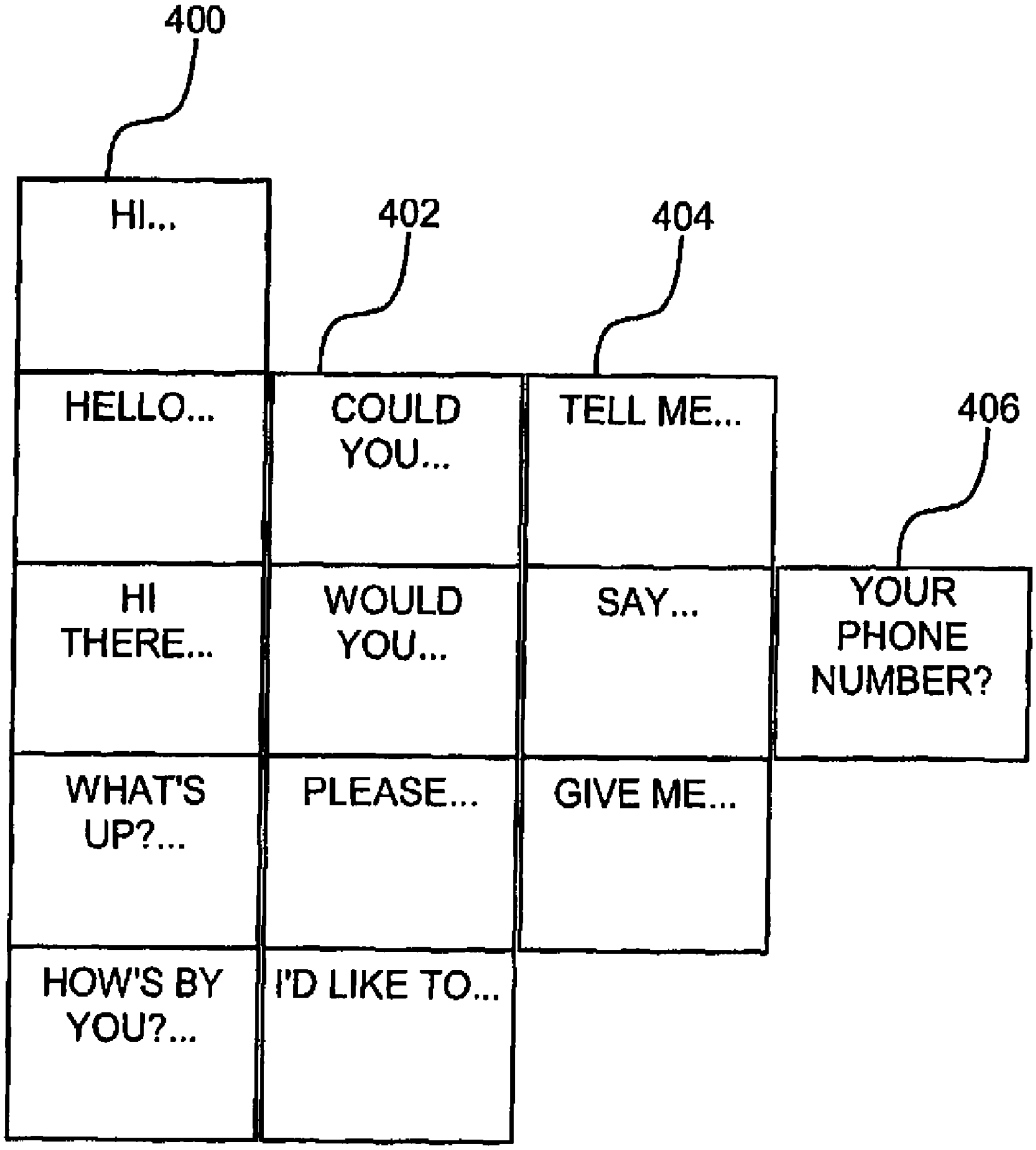
FIG. 4 is a simplified pictorial illustration of a flexible speech association structure, constructed and operative in accordance with a preferred embodiment of the present invention.

Additional reference is now made to FIG. 4, which is a simplified pictorial illustration of a flexible speech association structure, constructed and operative in accordance with a preferred embodiment of the present invention. FIG. 4 shows how multiple speech elements of one type may be associated with multiple speech elements of another type, which in turn may be associated with multiple speech elements of another type, and so on. In FIG. 4 a speech element 400 of type "greeting" is shown having several pre-recorded variations. Speech element 400 is associatively followed by a speech element 402 of type "request" which is also shown having several pre-recorded variations. Speech element 402 is in turn associatively followed by a speech element 404 of type "action" which is also shown having several pre-recorded variations. Finally, speech element 404 is followed by a speech element 406 of type "object" of which a single pre-recorded variant is shown. As may be clearly seen, a single sentence may be formed in many different ways by selecting one variant of each speech element.

Figure 5:
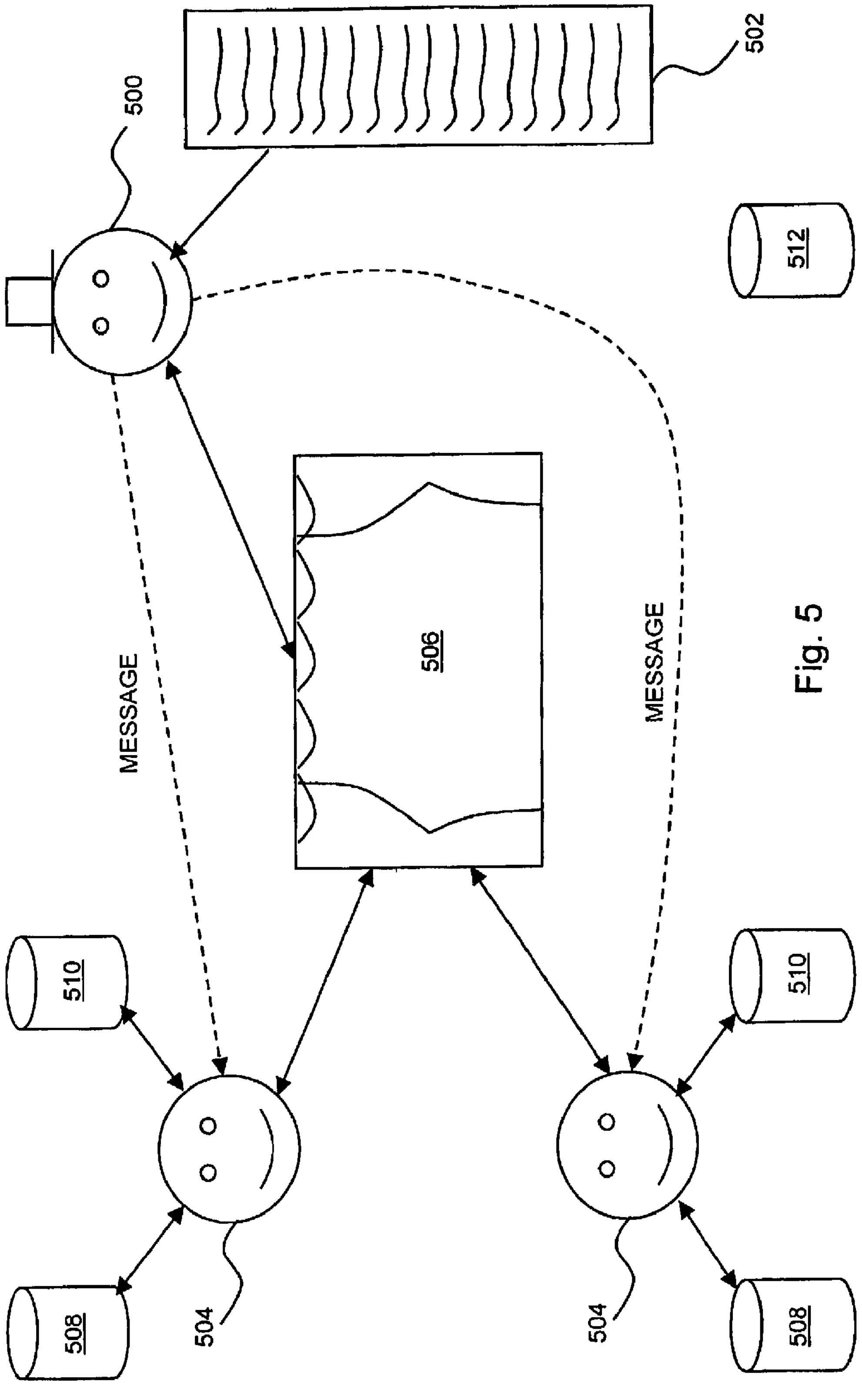
FIG. 5 is a simplified conceptual illustration of a virtual theater architecture, constructed and operative in accordance with a preferred embodiment of the present invention.

Reference is now made to FIG. 5, which is a simplified conceptual illustration of a virtual theater architecture, constructed and operative in accordance with a preferred embodiment of the present invention. In the virtual theater architecture of FIG. 5, a stage manager 500 interprets a flow script 502 of a telephone show. To carry out flow script 502, stage manager 500 sends messages to one or more virtual performers 504 that are each assigned the task of playing the role of a specific character in the telephone show. A stage 506 maintains show state information and acts as the venue where virtual performers 504 exhibit their behavior. Each virtual performer 504 maintains a set of behavior rules 508 and a behavior history 510 which includes past behavior as well as its current state, and is capable of "watching" stage 506 to monitor show state information and of receiving messages from stage manager 500. Each virtual performer 504 determines its own behavior, such as speech or other non-verbal actions or gestures, by applying its behavior rules 508 to show state information, incoming messages, and its behavior history 510. If a reaction to stage events and/or messages is warranted, virtual performer 504 expresses its behavior on stage 506 by means of one or more messages sent to stage 506 for other virtual performers 504 to "see" and "hear", to which they may in turn react. Thus, in the virtual theater architecture, the execution of a GDML flow script is "delegated" in part to the stage manager and virtual performers who determine which, how, and in what order bubbles and bubble classes are performed based on rules provided by the GDML script and by their own rule sets This mechanism provides a balance between the scripted dramatic story line and the spontaneity of the autonomous virtual performers.

A vocabulary 512 of words, phrases, and sentences is prerecorded and maintained for each virtual performer 504, preferably in a different voice for each virtual performer 504. For example, the virtual performer playing the role of Homer Simpson uses stored audio files of Homer's voice to speak Homer's "lines", preferably using flexible speech as described hereinabove.

Each virtual performer 504 may have a number of states, such as its mood and the nature of its relationship with each of the other virtual performers, such as annoyance with one virtual performer and friendship with another.

The information maintained by stage 506 preferably includes general information such as the list of active virtual performers in the current telephone show and the characters that they portray. Stage 506 also preferably maintains show-specific information such as how many times a particular virtual performer has performed a task, such as asking a question on a quiz show, or how many correct answers the caller has given. For a baseball game, stage 506 may maintain information such as the identity of the current batter, the current number of balls and strikes, etc.

A caller may control a particular virtual performer to a pre-defined extent by providing input where prompted. For example, a caller may control a pitcher in a baseball show. The caller's command determines, for example, the type of pitch to be thrown. However, the pitcher may also behave in a semi-autonomous fashion, such as by generating non-verbal gestures such as "stepping off the mound", "shaking off a pitch," and "wiping his brow."

Each element of the virtual theater may be implemented using well-known autonomous intelligent agent architectures. The virtual theater data, rules, and messages may be implemented using conventional schema and ontologies. The messaging system may be implemented using standard message schema such as the FIPA Agent Communication Language.

One exemplary operational scenario of the virtual theater of FIG. 5 may be illustrated within the context of a more detailed description of the humorous quiz show described hereinabove. In this scenario stage manager 500 directs the virtual Performer Bart Simpson, in accordance with the directives of flow script 502, to introduce the three panelists. The virtual performer playing the role of Bart has freedom of choice in carrying out this task, and proceeds as follows:

1. Bart must first choose which panelist he wants to introduce. Bart bases his decision on a list of current panelists, and the history of who's been called upon so far in the show (i.e., whose turn is it). This information is maintained by stage 506.
2. Bart must then decide if he wants to use a quip. Bart bases his decision on his mood, current relationship with that character, etc. If his mood is playful, he is more likely to quip. If his current relationship with the character he's introducing is friendly, his quip will be positive. Both his mood and his relationship with a particular character are aspects of Bart's state which may change during the performance.
3. Bart then utters the first part of the introduction.
4. Bart then utters a quip, if he so decides, and sends a quip event notice to stage 506.
5. Bart then utters the name of the panelist, and sends a notification of the event (i.e., having introduced a particular panelist) to stage 506. Bart then notifies stage manager 500 that he has completed his task.

An example of Bart's introduction with a quip is: "The next question will be asked by—that menace to mankind—Homer Simpson". An example of Bart's introduction without a quip is: "The next question will be asked by—Homer Simpson".

In accordance with flow script 502, stage manager 500 next decides if a retort is warranted to Bar's quip if made, with stage manager 500 having been notified by Bart that he made a quip, and with stage manager 500 having "heard" the quip by monitoring stage 506. The virtual performer playing the part of the audience is likewise apprised of Bart's action on stage 506, to which the audience may autonomously decide to react to the quip with an appropriate response, such as gasping, cheering, laughter, applause, etc. The virtual performers playing the roles of the panelists also "hear" the positive or insulting quip and "see" the target of the insult or compliment. The virtual performer who is the target of Bart's quip may decide to change his/her state to reflect a change in mood and/or a possible change in his/her relationship with Bart.

If stage manger 500 decides that a retort to Bart's quip is not called for, then stage manger 500 directs the panelist whom Bart introduced to ask the contestant a question.

If stage manger 500 decides that a retort to Bart's quip is called for, stage manager 500 selects the virtual performer to respond to Bart's quip and directs him to respond to the quip. As before, the nature of the response is determined using criteria such as the virtual performer's mood, relationship with the target of the quip, the nature of the quip itself (e.g., positive or insulting), etc.

When the virtual performer delivers the retort, stage 506 is notified of the retort, including whether it is positive or negative, to whom it is directed, etc. Stage 506 then notifies all the virtual performers, including the audience who may react with appropriate cheers, boos, applause, laughter, etc., as well as stage manager 500, of the retort.

Stage manager 500 then decides if more quips and retorts are required, or if Bart should be directed to call the panelists to order and a panelist directed to ask a question of the contestant.

When a panelist is directed to ask a question, the panelist selects a question from a library of questions, and then asks that question of the contestant, who is being played by the caller. When the caller responds through the caller's virtual performer, the panelist "bears" the caller's answer and decides, according to pre-programmed information available to the panelist, whether the answer is correct or not.

If it is determined that the answer is not correct, the panelist notifies stage 506 that the caller has answered incorrectly. Stage 506 in turn notifies the audience, the other virtual performers, stage manager 500, etc. Flow script 502 then directs the flow of the telephone show to an appropriate bubble outline dealing with incorrect responses.

If the answer is correct, the panelist announces that the caller has answered correctly and notifies stage 506 accordingly. Stage 506 in turn notifies the audience, the other virtual performers, stage manager 500, etc. Flow script 502 then directs the flow of the telephone show to an appropriate bubble outline dealing with correct responses.

Play may continue in this fashion, with quips, retorts, questions, and answers, until stage manager 500 decides that the flow script's show ending criteria are met and if the caller has won or lost.

Figure 6:
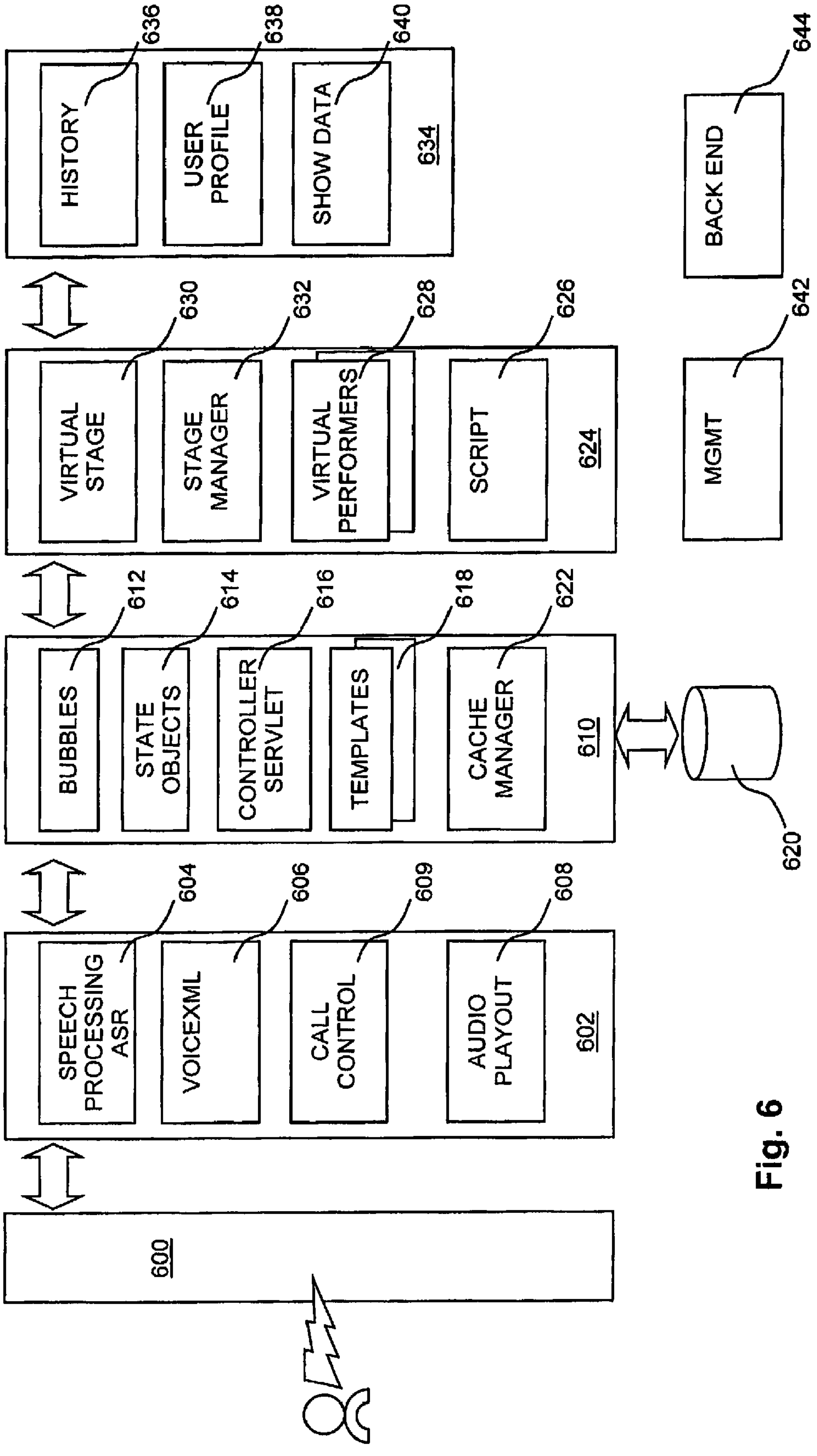
FIG. 6 is a simplified block diagram illustration of a telephone entertainment system, constructed and operative in accordance with a preferred embodiment of the present invention.

Reference is now made to FIG. 6, which is a simplified block diagram illustration of a telephone entertainment system, constructed and operative in accordance with a preferred embodiment of the present invention. The system of FIG. 6 includes a telephony interface 600 interfacing with a speech/voice layer 602, which includes a speech processor 604 capable of performing automatic speech recognition, a module 606 for facilitating input and output, such as a VoiceXML module, an audio playout module 608 for producing audio output, and a call control module for interfacing between VoiceXML module 606 and telephony interface 600. Speech/voice layer 602 in turn communicates with a presentation layer 610 where flow script bubbles 612 are prepared for output and where call state information 614 is maintained. A servlet controller 616 uses Java® Server Page (JSP) to populate pre-defined VoiceXML templates 618 with links to audio content 620 in order to carry out bubbles 612. A cache manager 622 identifies and caches flow script segments for rapid audio content retrieval and play out.

Presentation layer 610 communicates with a game engine layer 624 where flow scripts 626 are processed and where software agents, representing virtual performers 628, a virtual theater stage 630, and a stage manager 632, operate. Game engine layer 624 uses a data layer 634 for storing/retrieving game variables and other show data such as real-world statistics, language models and behavior information, in a show data store 640, and for recording caller history in a history store 636, and for accessing user profile information 638. System administration is provided via a management application 642, while back-end application 644 may include functions such as generating reports.

The system of FIG. 6 is preferably implemented using a scalable, multi-tier framework such as that specified by Java® 2 Platform, Enterprise Edition. The engine components of system of FIG. 6 are preferably implemented using an agent-oriented architecture. Communication between agent components is preferably implemented using a scalable messaging system, such as a CORBA-compliant messaging system or the Java® Messaging System, and system data are preferably stored using a scalable persistence framework, such as that specified by the Java® 2 Platform, Enterprise Edition. The system may be implemented using application servers compliant with this framework, such as the Weblogic server product family, commercially available from BEA Systems, Inc. The data layer 634 may be implemented using a scalable relational or object-relational database, such as those commercially available from Oracle Corporation or Microsoft Corporation.

Telephony interface 600 preferably includes conventional hardware and software components for interfacing with telephony networks, such as PSTN networks, including PRI or SS7 signaling capabilities for more robust call control, such as those commercially available from Intel Corporation or NMS Communications. Additionally or alternatively, VoIP networks with SIP or H323 may be supported. Telephony interface 600 is preferably configured to support land and mobile telephone handsets, and VoIP devices. Although these devices primarily send and receive voice communications, they may additionally support other modalities, such as SMS, WAP, MMS, that may be used for providing alternate caller data input and output routes for telephone shows. Telephony interface 600 may also be configured for use with more intelligent handsets, such as those configured with Java® 2 Platform, Micro Edition or Qualcomm BREW™ functionality. Such handsets may function as players for media protocols such as SML, as well as having some internal speech recognition capability. The capabilities of the next generation networks, such as UMTS and the intelligent handsets will improve both the quality of the audio, as well as the scalability of the overall system, as compared to a typical connection based telephone network. In order to support such intelligent handsets, presentation layer 610 may be configured with JSP Templates to support the necessary protocols such as SMIL, in addition to VoiceXML.

Figure 7:
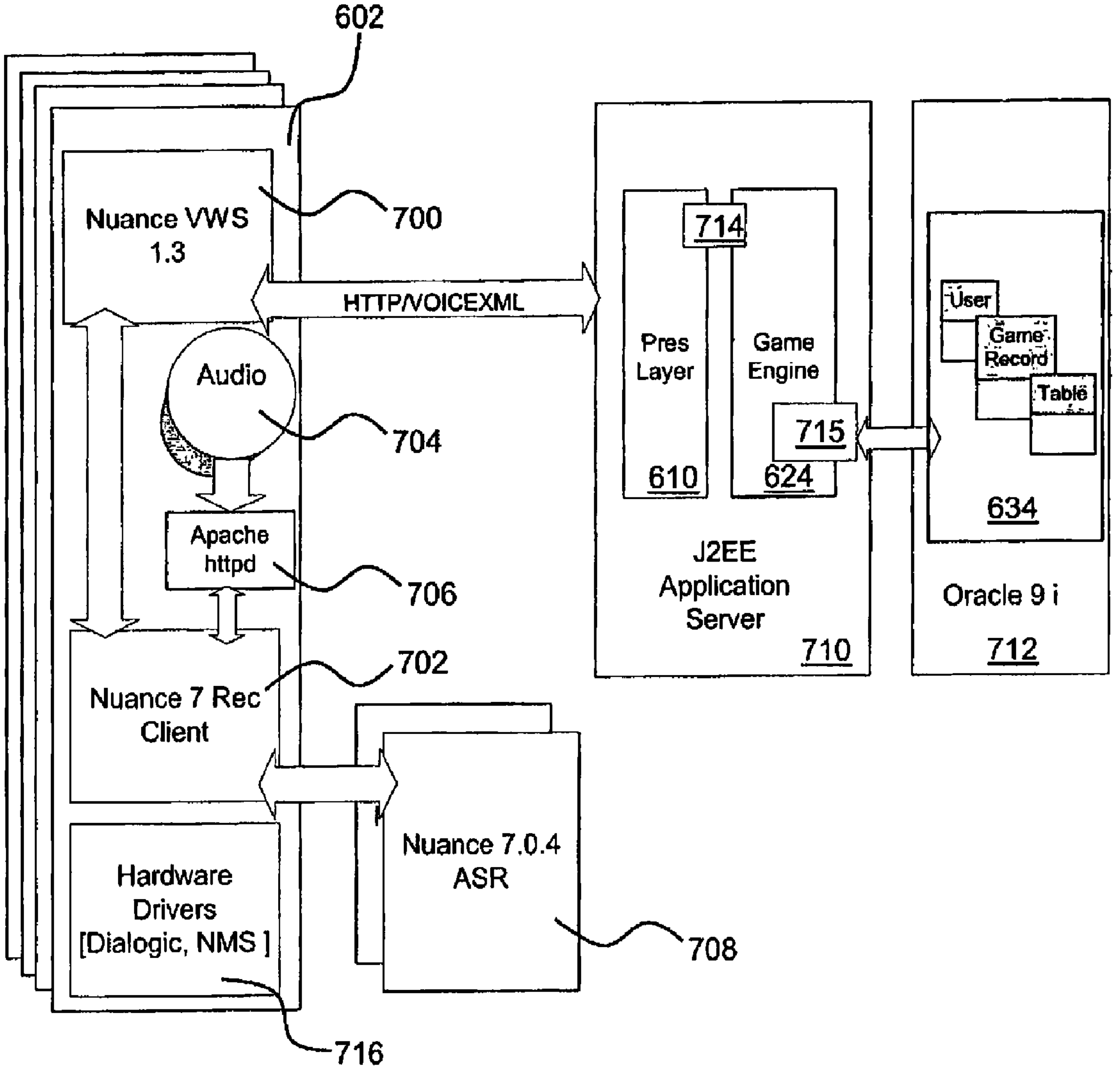
FIG. 7 is a simplified block diagram illustration of selected elements of the telephone entertainment system of FIG. 6, constructed and operative in accordance with a preferred embodiment of the present invention.

Additional reference is now made to FIG. 7, which is a simplified block diagram illustration of selected elements of the telephone entertainment system of FIG. 6, constructed and operative in accordance with a preferred embodiment of the present invention. In FIG. 7, speech/voice layer 602 (FIG. 6) is shown including a VoiceXML interpreter 700, such as VWS 1.3, commercially available from Nuance Corporation, and a CallControl and Telephony MiddleWare component 702, such as a Nuance's Rec Client, which accesses an audio cache 704 via an HTTP interface 706, such as an Apache HTTPD application. An ASR module 708, such as Nuance's Rec Server, provides speech/voice layer 602 with automatic speech recognition. A telephony interface 716 preferably includes standard hardware and/or software, such as is commercially available from Intel Corporation, NMS Communications, or VocalTec, for interfacing with telephone and/or VoIP networks.

Presentation layer 610 and game engine layer 624 are both shown installed on an application server 710, such as a J2EE server, while data layer 634 is shown installed on database server 712, such as an Oracle 9i server. Communications between presentation layer 610 and game engine layer 624 may be carried out using Java® beans 714 as Value Objects. Communications between the game engine layer 624 and the data layer 634 may be carried out using Java® beans 715 as Data Objects.

The ASR processing of caller responses at plot points is preferably done using grammars. Typically, a caller will have a small set of decision choices that he may make at the plot point. Thus, a grammar may be generated that encompasses the spoken language variants for these choices. For example, in the case of the baseball show, the caller may choose a fast ball pitch using any of the following responses: "Fast", "Fast Ball", "I wanna Fast Ball", "Throw a urn Fast Ball". Conventional ASR techniques, such as Finite Grammar Patterns and Stochastic Language Models (N-Gram), may be used in this regard, and multiple languages may be supported using conventional techniques.

Presentation layer 610, as the interface layer between the game engine and the speech/voice layer, is responsible for all voice-user interface (VUI) flow management, and the generation of the dynamic VoiceXML. Presentation layer 610 may be based on the J2EE JSP Model 2 Architecture. In this model, servlet controller 616 provides the entry point for requests to the system. Servlet controller 616 then interfaces with Java beans 714 for application logic, and then forwards the request to the appropriate JSP.

The handling of requests and the JSPs are typically defined in an XML file. This file defines:

Actions
: Actions define the group of tasks and JSPs that the controller will use for a specified request. The action can consist of a pretask, a posttask and a JSP. The action definition may also include a switch statement, which allows the controller to select the nextAction based on a return code of the task.

PreTasks
: PreTasks are Java® classes that implement functionality that should be performed before the controller forwards the request to the next JSP.

PostTasks
: Posttasks are Java® classes that implement functionality that should be performed on a response to the current JSP.

JSPs
: The JSPs provide templates for building the dynamic VoiceXML.

Events
: Events define global actions that may be accessed across dialogs. This includes handling global events such as a request for help. The event mechanism is supported through a context stack—which allows presentation layer 610 to manage context.

Exceptions
: Presentation layer 610 defines actions to handle both run time as well as application exceptions.

The following is an example of a presentation layer definition XML:

```
<fluidxml>
    <actions>
        <action name="start">
            <pretask class="com.zow.dev.StartSoccer">
                <switch>
                    <branch return="TIME_IS_UP"
                    nextAction="end"/>
                </switch>
            </pretask>
            <jsp path="present.jsp"/>
        </action>
        <action name="play">
            <pretask class="com.zow.dev.PlaySoccer">
                <switch>
                    <branch            return="INAPPROPRIATE"
nextAction="inappropriate"/>
                    <branch return="TIME_IS_UP"
                    nextAction="end"/>
                </switch>
            </pretask>
            <jsp path="present.jsp"/>
        </action>
        <action name="inappropriate">
            <jsp path="inappropriate.jsp"/>
        </action>
        <action name="hangup">
            <pretask class="com.zow.dev.Hangup"/>
            <jsp path="exit.jsp"/>
        </action>
        <action name="end">
            <pretask class="com.zow.dev.EndSoccer"/>
            <jsp path="presentEnd.jsp"/>
        </action>
    </actions>
</fluidxml>
```

The interface functionality between presentation layer 610 and game engine layer 624 is specified by specific preTasks. The user response at each plot point is handled by a presentation layer task, which then invokes game engine layer 624. Game engine layer 624 uses GDML and game logic to compute the next transition and plot point, and returns all audio prompt, dialog, and grammar information needed by presentation layer 610 to execute the JSP using a Java® Bean. The JSP then provides a template for the dynamic generation of VoiceXML.

Figure 8:
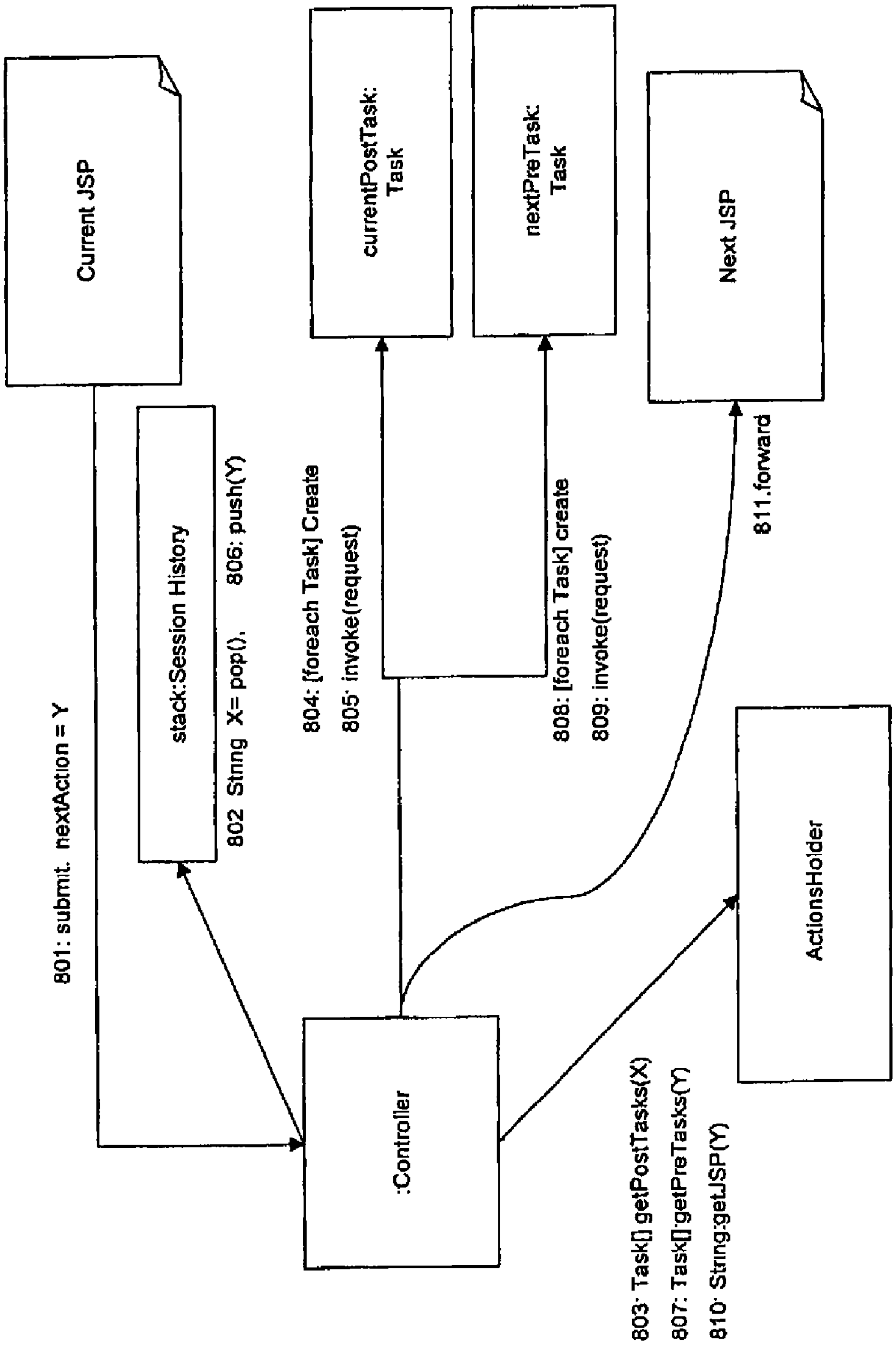
FIG. 8 is a simplified UML collaboration diagram of elements of the presentation layer described in the system of FIGS. 6 and 7, operative in accordance with a preferred embodiment of the present invention.

Reference is now made to FIG. 8, which is a simplified UML collaboration diagram of elements of the presentation layer shown in of FIGS. 6 and 7, operative in accordance with a preferred embodiment of the present invention. In the diagram of FIG. 8, the VoiceXML interpreter, having processed the VoiceXML specified by the JSP of the previous action, submits a request representing interpreted input from the user to the servlet controller (801). The servlet controller retrieves all relevant information from the presentation layer ActionsHolder and pops the session context (802) from the presentation layer stack. The servlet controller then gets a list of the post-tasks of the previous action (803) and performs them (804, 805). This mechanism allows for specifying processing of the request in the previous context, such as in validating input. The new session context is then pushed (806) on the presentation layer stack, and the list of pre tasks is retrieved (807). The controller then performs the pre tasks (808, 809). The controller forwards the flow to the next JSP to be presented (810, 811). As one can see, though the handling of a request always occurs between JSPs, the pre-task/JSP/post-task flow is formed by the fact that the controller does the post-task of the previous action before starting the next flow.

Figure 9:
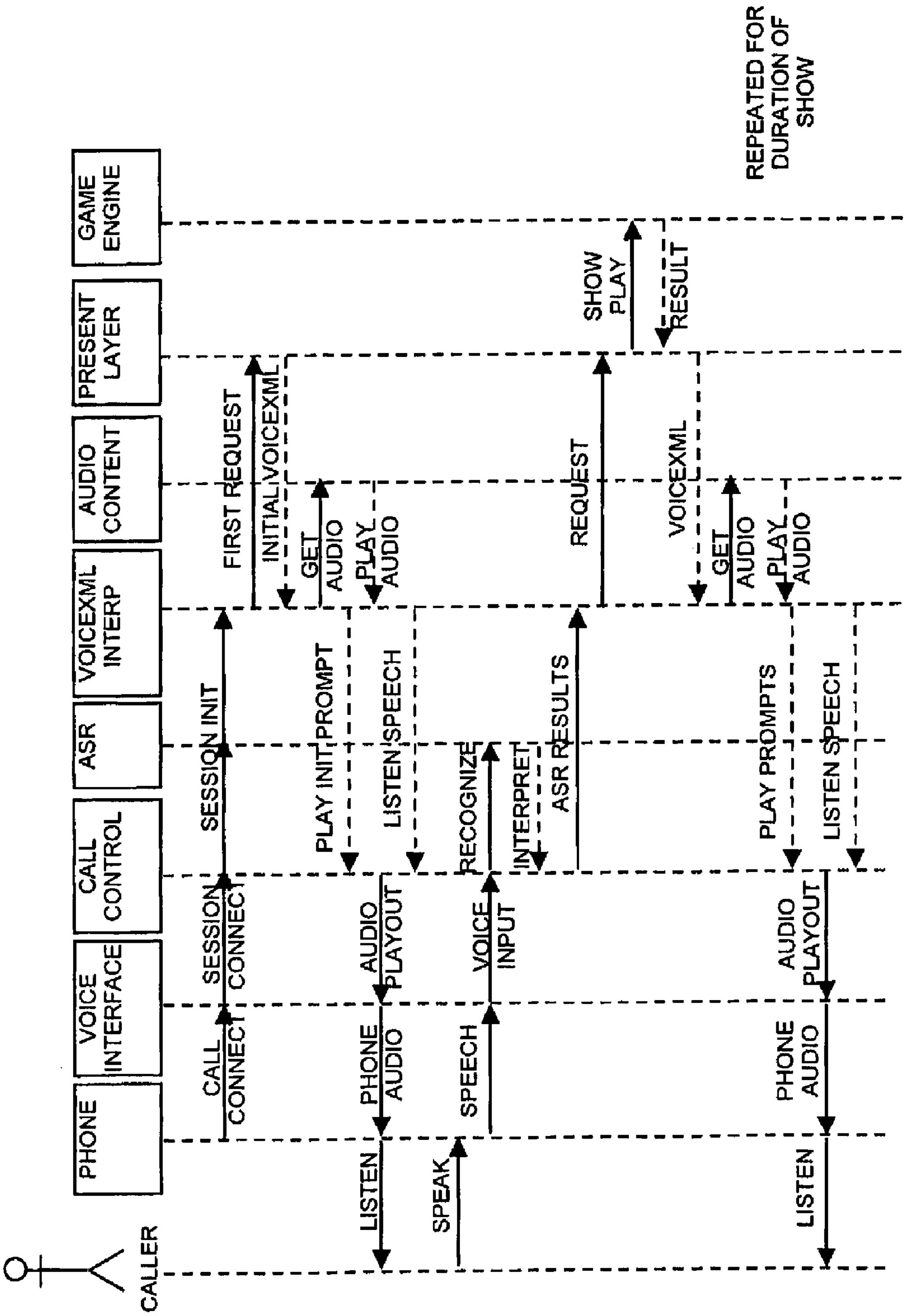
FIG. 9 is a simplified UML sequence diagram of a method of operation of the system of FIGS. 6 and 7, operative in accordance with a preferred embodiment of the present invention.

Reference is now made to FIG. 9, which is a simplified UML sequence diagram of a method of operation of the system of FIGS. 6 and 7, operative in accordance with a preferred embodiment of the present invention. The UML sequence diagram of FIG. 9 shows the flow of a telephone show call through the system, including the flow of the call, from the caller, through the telephony interface, VoiceXML and ASR to the game engine components. The flow describes the initiation of a call, and the subsequent audio content playout and voice command cycle.

In the method of FIG. 9 the caller initiates a telephone call to a telephone show by dialing the telephone number associated with the telephone show. The call arrives at the voice interface, and is represented by a callConnect message flow. The voice interface then informs the CallControl and Telephony MiddleWare that a new telephone session has begun, which then informs the VoiceXML interpreter of the new session, as represented by a sessionInit message. The VoiceXML interpreter sends a request to the presentation layer, as represented by a FirstRequest message. The presentation layer responds to the VoiceXML interpreter with an initial VoiceXML document that specifies the initial user voice interaction. The VoiceXML Interpreter processes this initial VoiceXML document and requests from audio cache or other storage any required audio segments indicated by the URLs in the VoiceXML document. The VoiceXML interpreter then passes the audio content to the callControl, and sets up a channel for receiving speech recognition data. The audio content is then played out over the voice interface through the telephone network to the caller's phone.

When the caller responds to a plot point by giving a voice command, the caller's speech flows from their phone over the telephony network to the voice interface and to the callControl's speech channel that is listening for voice input. This voice input is then sent to the ASR server for speech recognition. The result is then sent to the VoiceXML interpreter. Based on the VoiceXML document, the VoiceXML interpreter then sends a new request with the interpreted speech results to the presentation layer. The presentation layer's controller typically invokes a task which calls the game engine with the interpreted caller command. The game engine then determines the flow of the show, based on the caller's command, the engine logic, game state, and game history. The game engine then provides the presentation layer with the next plot point and transition, and all the necessary information for the presentation layer to construct the response VoiceXML document. The presentation layer controller then invokes the JSP which delivers the VoiceXML document to the VoiceXML interpreter. The call then continues with the playout of audio content and listening for further voice commands as described above.

Figure 10:
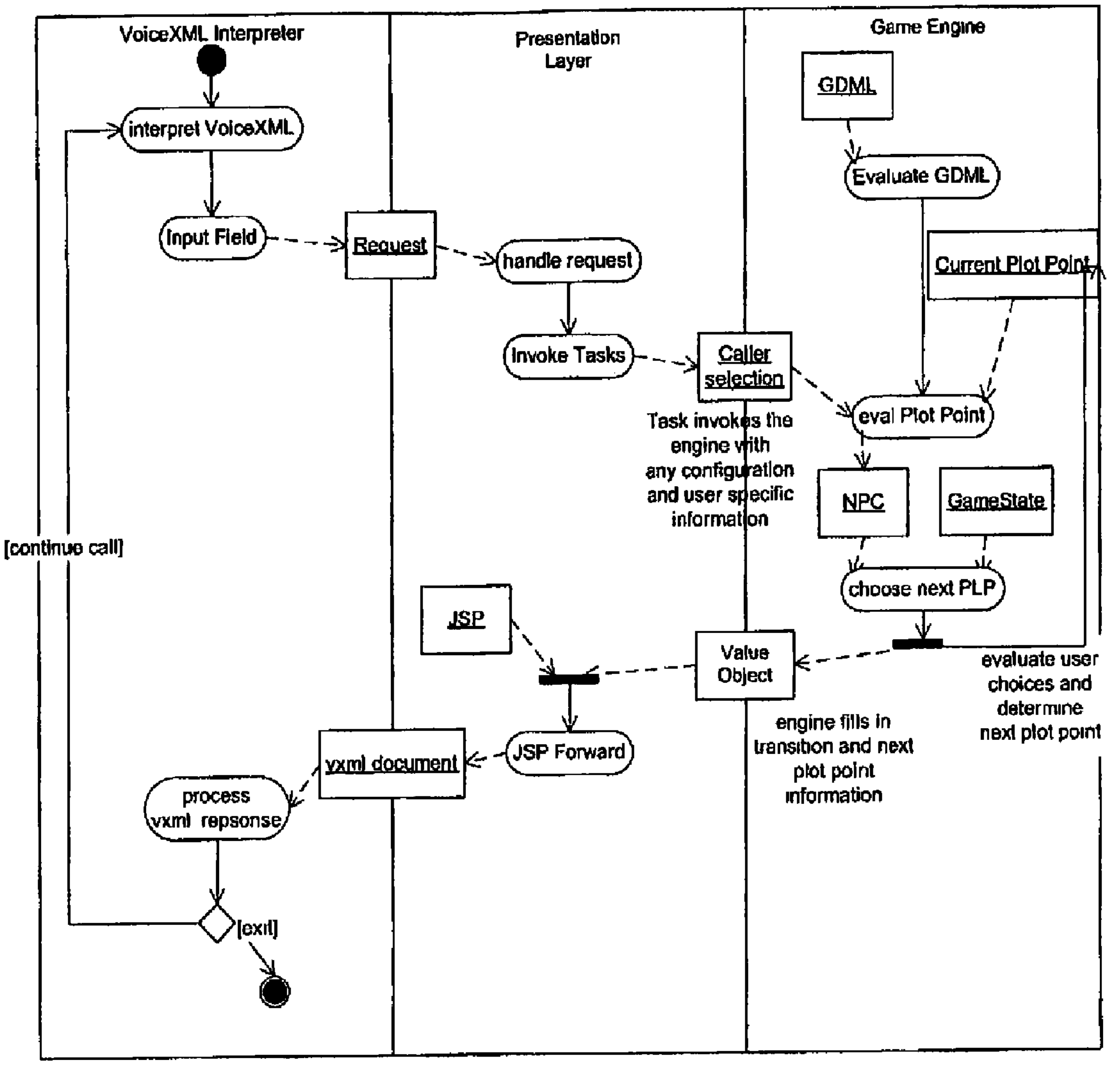
FIG. 10 is a simplified UML activity diagram of a method of operation of the system of FIGS. 6 and 7, operative in accordance with a preferred embodiment of the present invention.

Reference is now made to FIG. 10, which is a simplified UML activity diagram of a method of operation of the system of FIGS. 6 and 7, operative in accordance with a preferred embodiment of the present invention. The UML activity diagram of FIG. 10 shows the interface and the division of responsibility between the layers of the system for a GDML-based game engine. The diagram shows the delivery of dynamic VoiceXML to the VoiceXML interpreter by the system in connection with the handling of a caller voice command at a plot point. The VoiceXML interpreter forwards the input data as an HTTP request to the presentation layer. The presentation layer controller then invokes the necessary task. This task then calls the game engine. The game engine maintains the GDML and the current plot point information. The game engine then takes the caller selection, the plot point state information, and the input of the NPC and constructs a choice of the next plot point and transition based on the GDML specification. The game engine filters the relevant roles and determines the binding of context. Using this information, the bubbles are completely specified. The game engine returns this information to the presentation layer task through the Value Object 714. The game task uses the content manager to bind the full path to the bubble files. The controller then invokes the JSP, which generates the response VoiceXML document. This VoiceXML document is then returned to the VoiceXML interpreter which processes the document.

Figure 11:
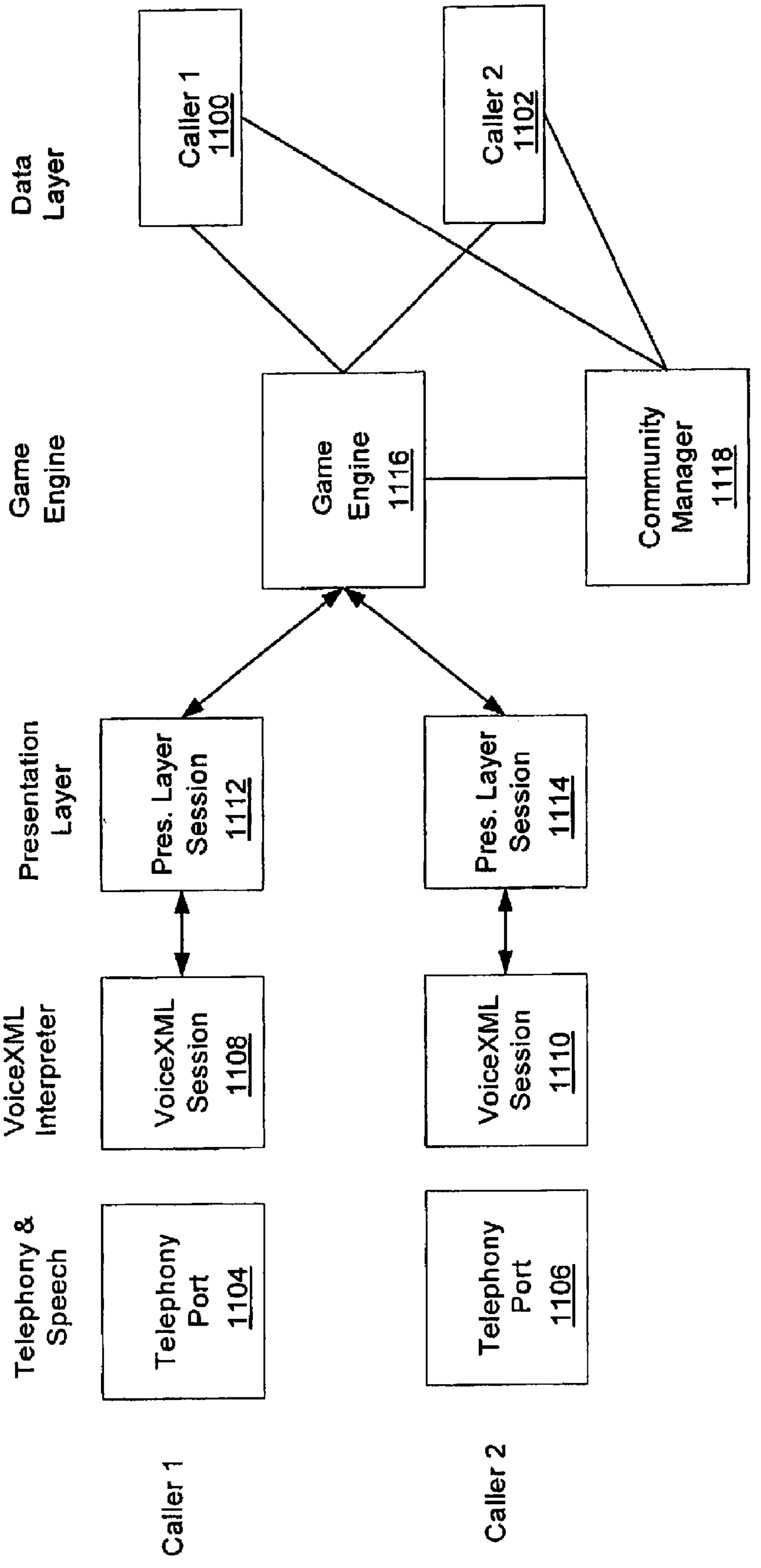
FIG. 11 is a simplified block diagram illustration of a method of multi-player operation of the system of FIGS. 6 and 7, operative in accordance with a preferred embodiment of the present invention.

Reference is now made to FIG. 11, which is a simplified block diagram illustration of a method of multi-player operation of the system of FIGS. 6 and 7, operative in accordance with a preferred embodiment of the present invention. In the diagram of FIG. 11 two callers 1100 and 1102 are each provided with a separate logical set of telephony resources, including separate telephony ports 1104 and 1106 and separate voiceXML sessions 1108 and 1110. Each voiceXML session is in turn handled by a separate presentation layer session 1112 and 1114. Both presentation layer sessions interface with a common instance of a game engine 1116. Appropriate data objects represent each caller's history and data. In a two-player telephone show, each player listens to the transition audio content. The transition content can be the same for both players or different.

A community manager 1118 may be provided to allow callers wishing to participate in a multi-player game to find each other and arrange game parameters, such as roles, game times, etc. Community manager 1118 may be used to manage league play, such as is described hereinbelow with reference to FIG. 17.

An example of a two-player telephone show is a two-player version of the soccer show described above. Using GDML context attributes, the transition descriptions of a soccer game can have identical sportscaster descriptions for both the caller on offense and the caller on defense, whereas the description of the plot point choices and game situation will be different based on the current role of each caller. Both callers are synchronized at the plot points, and the show continues when both callers have responded to their prompts at the plot point, whereupon the system delivers the next transition.

Figure 12:
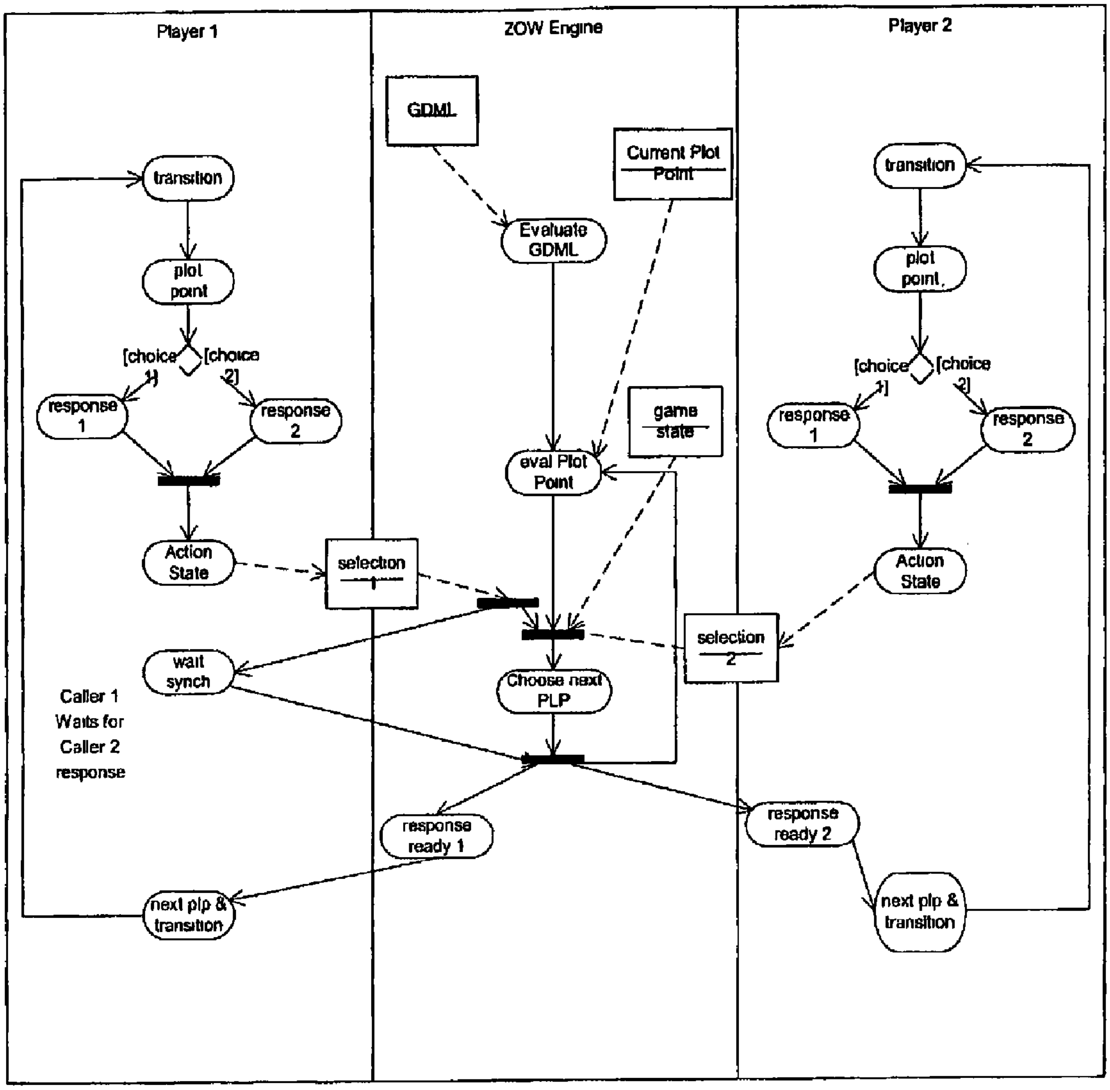
FIG. 12 is a simplified UML activity diagram of a method of multi-player operation of the system of FIGS. 6 and 7, operative in accordance with a preferred embodiment of the present invention.

Reference is now made to FIG. 12, which is a simplified UML activity diagram of a method of multi-player operation of the system of FIGS. 6 and 7, operative in accordance with a preferred embodiment of the present invention. The UML activity diagram of FIG. 12 describes the side-by-side flow of a two-caller telephone show. In a two-player show, a separate telephone interface and call control, as well as a VoiceXML interpreter session, is provided for each call. Each caller's experience is specified by the respective VoiceXML documents generated by the presentation layer, which maintains separate sessions for each caller. In the method of FIG. 12, each caller separately hears the transition and plot point prompts, and then gives a plot point voice command. The game engine interprets the voice commands, decides on the next plot point and transition, and through the presentation layer delivers to each caller their respective next VoiceXML document. The game engine then synchronizes the users at plot points as needed.

Figure 13:
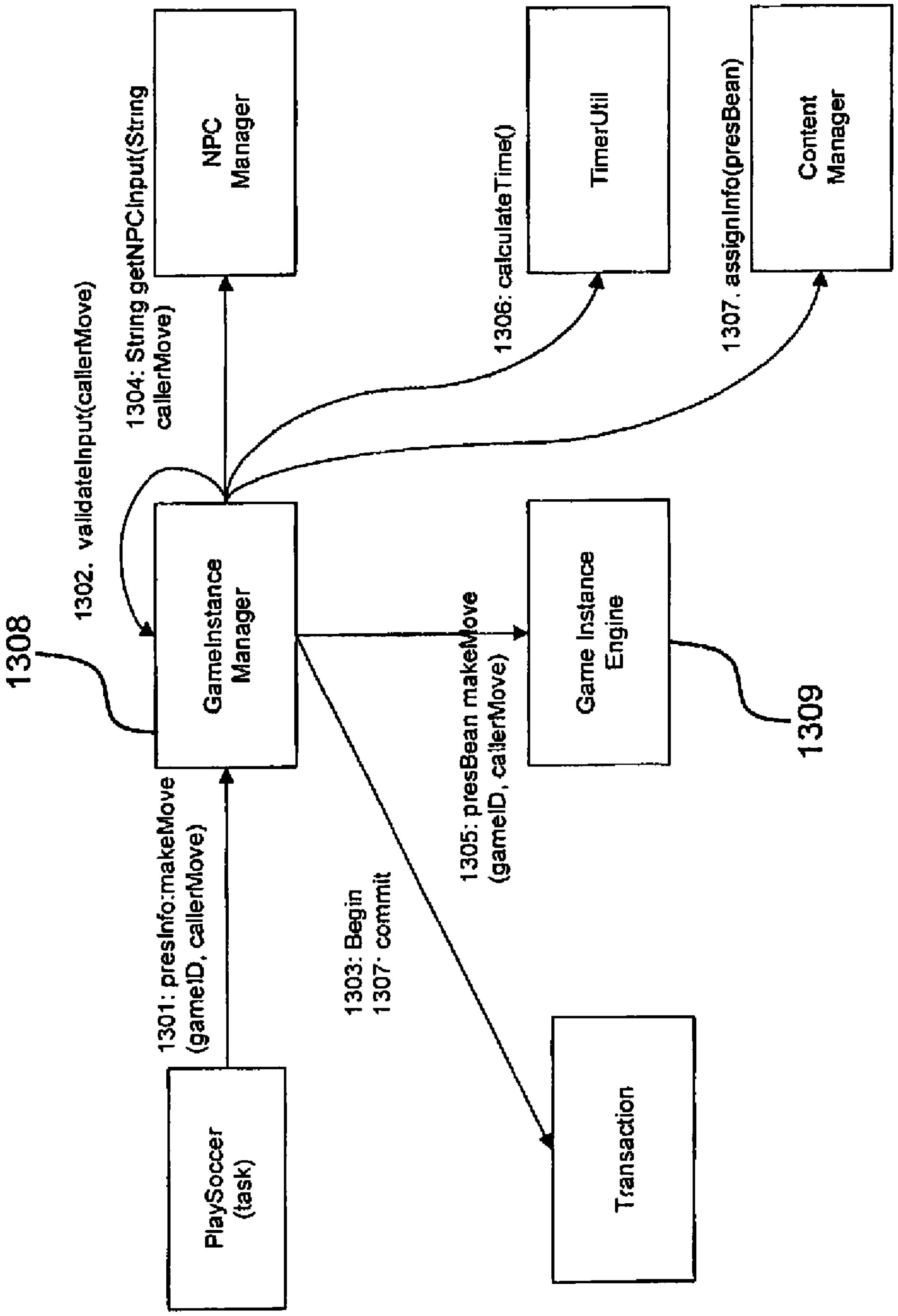
FIG. 13 is a simplified UML collaboration diagram of a game engine, constructed and operative in accordance with a preferred embodiment of the present invention.

Reference is now made to FIG. 13, which is a simplified UML collaboration diagram of a game engine, constructed and operative in accordance with a preferred embodiment of the present invention. The game engine of the present invention includes the following components:

GameInstance Manager 1308

The GameInstance Manager 1308 is the interface of the engine to the presentation layer task, and is responsible for coordinating the steps in the flow of a show.

GameInstance Engine 1309

The GameInstance Engine 1309 is the persistent, stateful object that is responsible for the logic and flow of a specific show. The GameInstance implementation will embody the logic and state for each kind of show. Binding of context is done by the GameInstance Engine 1309

TimerUtil

The TimerUtil is a utility which allows the GameInstance Manager 1308 to maintain the show clock UserBean The UserBean represents the identity and profile of the caller—such as league and preferences, and the interface to User Management.

UserHistory

The UserHistory represents the collection of the past shows the caller has played. This object maintains the history and the set of plot points traversed, historical engine state and results such as game score.

NPC

The NPC is the non-player-character object that is responsible for simulating an opponent in a two or more player game.

Content Manager

The Content Manager provides the necessary mappings for the GDML, and maps the bubbles to audio content paths

GDML

The GDML object maintains the show GDML Flow Script.

Configuration

The Configuration object maintains show configuration, such as team selection and NPC parameters.

The UML Collaboration diagram of FIG. 13 illustrates the interaction between game engine components in processing a caller voice command at a plot point. In FIG. 13 processing flow starts with a presentation layer task, such as "Play Soccer." The task calls the game engine through the GameInstance Manager 1308 (1301), specifying the game and the caller command. The GameInstance Manager 1308 is the mediator of the components, "orchestrating" the flow of control and information. The GameInstance Manager 1308 validates the input (1302) and begins a transaction to enable state persistence of the components with transactional integrity (1303). The Game Instance then queries the NPC Manager for the NPC response at the plot point (1304). The GameInstance Manager 1308 then calls the GameInstance Engine 1309 (1305) to process the caller command and the NPC response and determine the next plot point and transition. The GameInstance Manager 1308 (1306) then uses the TimerUtil to determine remaining game time, and the ContentManager (1307) to complete the information needed by the presentation layer to invoke the JSP and deliver the VoiceXML document response.

The game engine of the present invention may be implemented using J2EE design patterns as follows:

- The GameInstance Manager 1308 is implemented by using a mediator pattern and a Session Bean.
- The GameInstance Engine 1309 is implemented using a facade pattern, providing session beans for the game logic and state retrieval, and an entity bean for maintaining the game state.
- The UserBean object is implemented using a facade pattern. The session bean provides the access methods for the underlying entity beans. The user object also encapsulates integration with external User Management systems.
- The UserHistory object is implemented using a facade pattern. The session bean provides the access methods for the underlying entity beans. The user history object also encapsulates integration with external User Management systems.
- The NPC object is implemented using a facade pattern. The logic is implemented in a session bean, and the persistence allows the NPC to react based on the user's history
- The Content Manager is implemented as a JNDI serialized Java® Object to be available in a clustered configuration.
- The GDML object is implemented as a JNDI serialized Java® data structure. This data structure is validated and uses a hash table for fast access.
- The Configuration object is implemented as a JNDI serialized Java® data structure.

The GameEngine preferably maintains a persistent state that includes:

- Plot point traversed
- Show-instance-specific state, such as game score, virtual performer mood, or caller mood
- Show-instance-specific results and statistics.

The show-instance-specific data is preferably described as name-value pairs using ontologies as described hereinabove with reference to data, rules and messages.

The UserBeans may use connectors such as in the Java® Connector Architecture to provide integration with back-end systems such as user management systems, Web applications and SMS.

Figure 14:
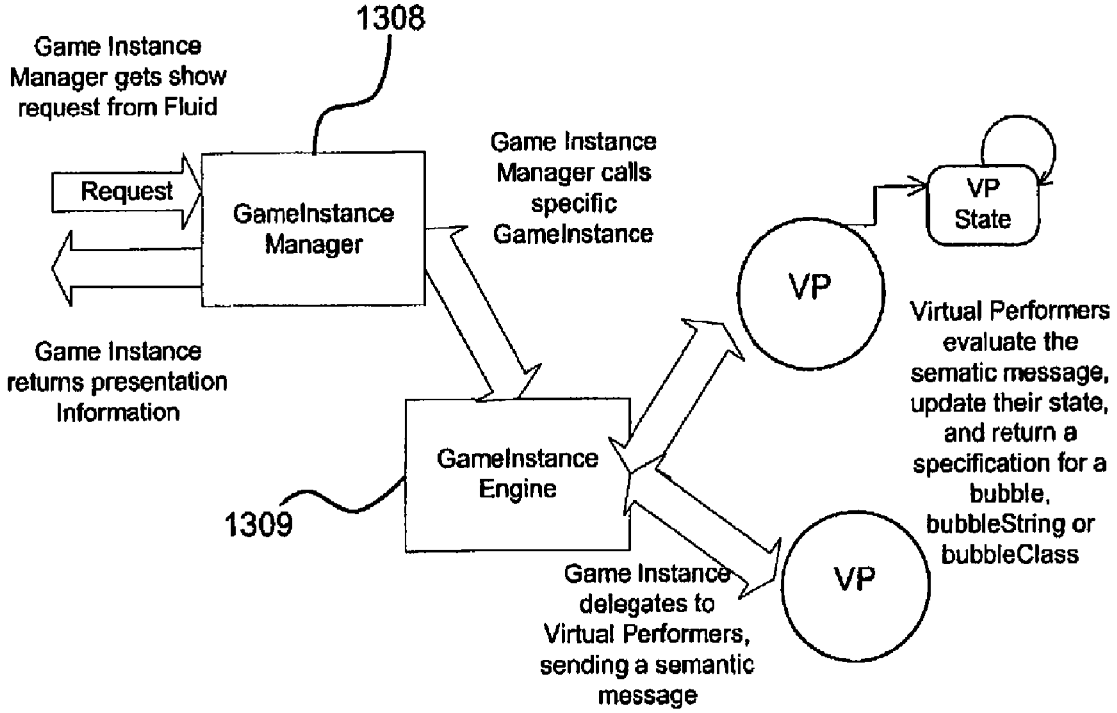
FIG. 14 is a simplified pictorial illustration of aspects of virtual performer implementation, operative in accordance with a preferred embodiment of the present invention.

Reference is now made to FIG. 14, which is a simplified pictorial illustration of aspects of virtual performer implementation, operative in accordance with a preferred embodiment of the present invention. The game engine of the present invention delegates roles specified in the GDML flow script to virtual performers. The roles themselves are specified as semantic messages in the GDML flow script. The virtual performers receive the semantic messages, and return BubbleString, Bubbles or BubbleClasses, and optionally update their state. In FIG. 14 the GameInstance Manager 1308 receives a show initiation request from the presentation layer. The Game Instance Manager 1308 than calls a specific GameInstance which delegates the flow script roles to the virtual performers by sending semantic messages to them. Each virtual performer evaluates each semantic message, updates its state, and returns a specification for a Bubble, BubbleString, or BubbleClass to the GameInstance. The GameInstance Manager 1308 then returns presentation information to the presentation layer through a Java® bean.

In the following example of a GDML flow script, a baseball sportscaster is requested to respond to the action of a batter stepping away from the batting box. This message is defined in a baseball game ontology, and the sportscaster virtual performer maintains a rule to respond to this event.

```
<!                    Beginnings                    >
<transition name="initialTr" starting="nullPlp" ending="01Plp"
cop="false" changesScore="false">
        <bubbleString role="both">
            <vpMessage name=sportscaster >
        < message> communicative-act= request
                <sender name= BOTN-Engine/>
                <receiver name = sportscaster/>
                <content>
                        Baseball::BatterLeavesBox
                    </content>
                <ontology name= Baseball/>
        </message>
            </vpMessage>
            <bubble reference="Nullto01" context="defense"/>
        </bubbleString>
</transition>
<!                    Endings                    >
```

For example, the response of the virtual performer sportscaster in this case could be <bubble reference="BatterLeavesBox" context="general"/>

This response defines at the GDML level the BubbleClass that the Sportscaster virtual performer chooses to deliver.

Figure 15:
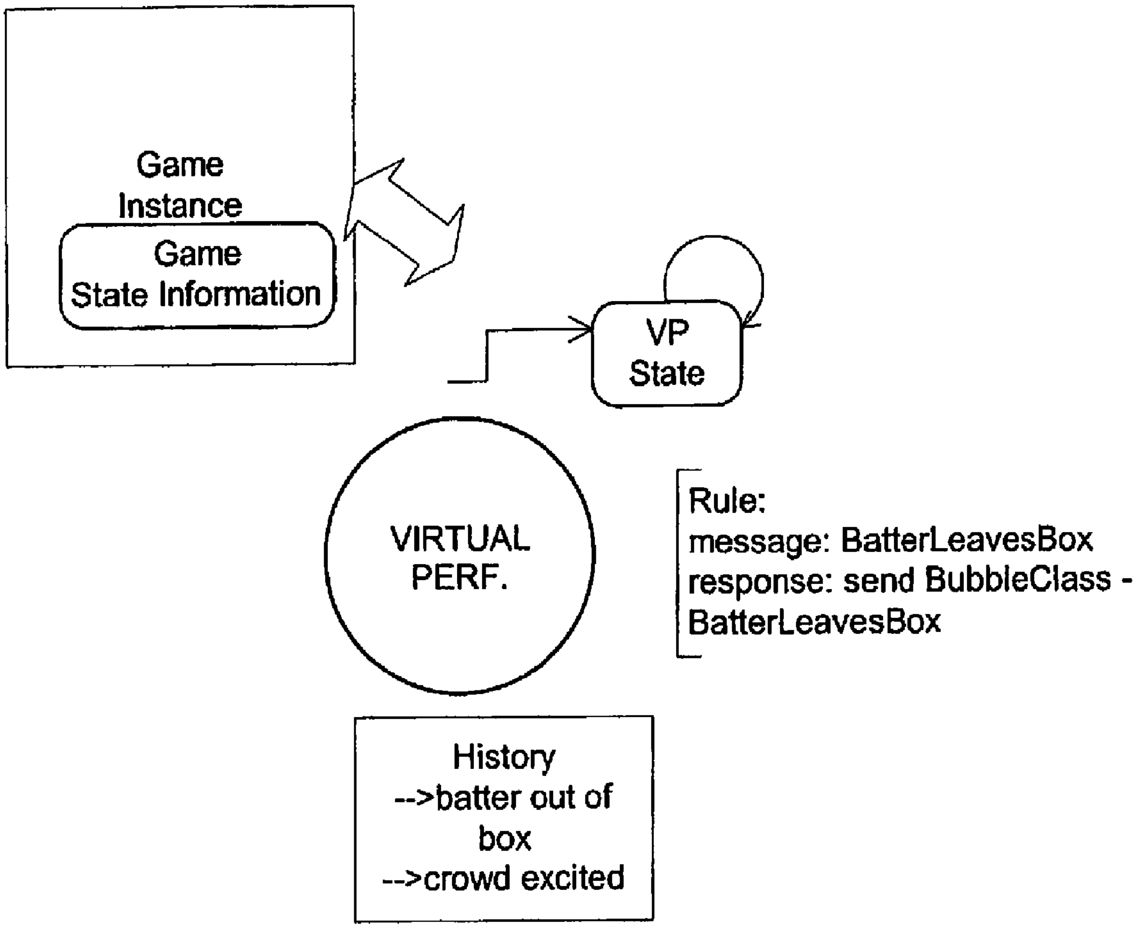
FIG. 15 is a simplified pictorial illustration of aspects of virtual performer implementation, operative in accordance with a preferred embodiment of the present invention.

Reference is now made to FIG. 15, which is a simplified pictorial illustration of aspects of virtual performer implementation, operative in accordance with a preferred embodiment of the present invention. In FIG. 15 A virtual performer is shown basing his behavior on his rule set, his local history, and the game state information maintained by the GameInstance. The rules are typically specified as a response to a message, which specifies a list of actions. These actions can be:

- Send Bubble/BubbleClass/BubbleString
- Invoke internal Java® method
- Update a state variable in the virtual performer.

The virtual performer state is preferably described as a name-value pair using pre-defined ontologies. These Ontologies preferably include the domain ontology of the show, as well as general ontologies that describe mood and emotion, such as the HumanML ontology.

The author of the telephone show preferably specifies these rules as declarative rules when defining the character of the virtual performer. These rules may be specified using a standard syntax such as BRML or RuleML. The virtual performer implementation includes the mechanism to trigger these rules and correctly evaluate them using an interface such as that specified by the Java® Rule Engine API in JSP 94.

Show history and state information is preferably stored and retrieved as name-value pairs or tuples according to a predefined ontology. Virtual performers preferably use known agent learning techniques, which provide for adaptation to caller behavior. For example, a virtual performer baseball batter would infer that a caller consistently chooses to throw a sequence of fast ball, curve ball, and slider. The batter would then infer a new rule to anticipate a slider following a fast ball and a curve ball.

Virtual performers are preferably implemented as distributed objects on the framework described above. Typically, in a J2EE implementation, a virtual performer will consist of a session bean to encapsulate the character functionality, an entity bean to encapsulate persistence of state, and a message-driven bean to allow the virtual performer to react and change state based on events. Requests to a virtual performer are preferably implemented using an XML binding of FIPA-style interaction protocol messages.

Figure 16:
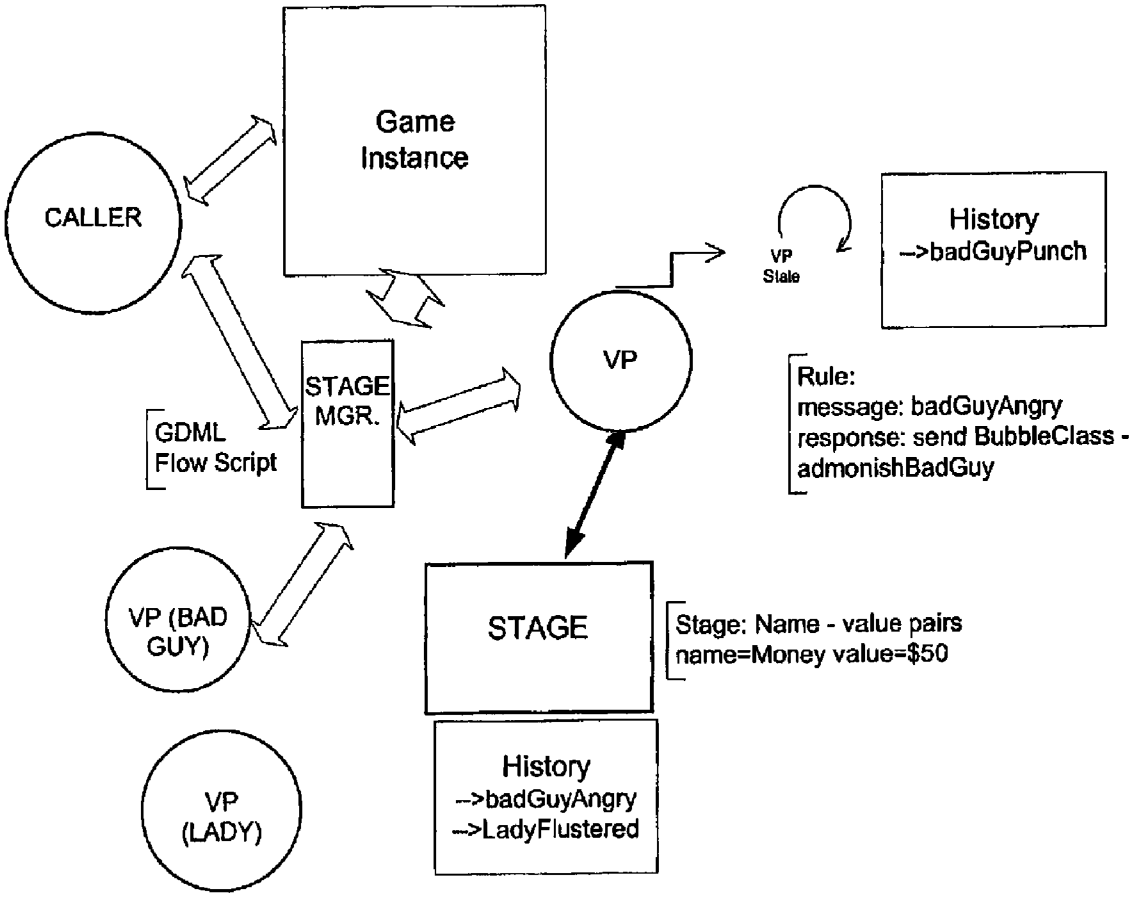
FIG. 16 is a simplified pictorial illustration of aspects of virtual theater implementation, operative in accordance with a preferred embodiment of the present invention.

Reference is now made to FIG. 16, which is a simplified pictorial illustration of aspects of virtual theater implementation, operative in accordance with a preferred embodiment of the present invention. In FIG. 16 a stage manager manages the narrative flow of a flow script and delegates the roles virtual performers. The stage manager controls the flow of the GDML flow script, and requests from the virtual performers to respond to the flow script messages. The virtual performers use their history and rules to determine their response, and can consult the stage. The stage maintains a set of global name-value pairs which describe the state of the show, the actions other virtual performers are performing, and the responses of the caller. The caller, through the virtual performer he controls, makes plot point decisions that the stage manager uses to interpret the direction of flow script execution.

Figure 17:
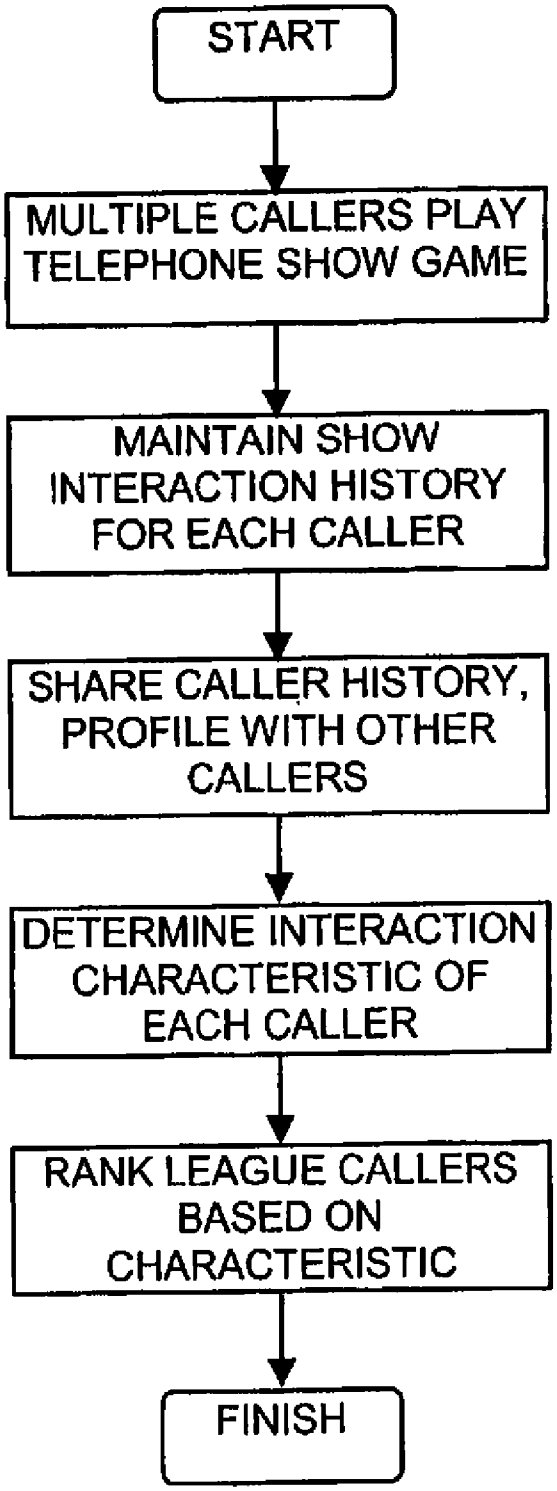
FIG. 17 is a simplified flowchart illustration of league-based telephonic entertainment, operative in accordance with a preferred embodiment of the present invention.

Reference is now made to FIG. 17, which is a simplified flowchart illustration of community-based telephonic entertainment, operative in accordance with a preferred embodiment of the present invention. A telephone show community may be created by recording the history of each caller's performance with respect to a telephone show and then making this history, and optionally the caller's profile information, available to other callers. This serves to establish caller reputation and identity that is reinforced in the telephone show, particularly in multi-player shows. The caller's information is preferably made available based on permissions that the caller provides during their participation in a show. In the context of a competitive telephone show, such as a sports show, this may be extended to maintaining leagues in which callers compete with each other. The callers may then be ranked based on their performance in the show. For example, in the case of a baseball show, callers may be scored based on their role as a pitcher. Statistics such as earned run average may then be used for ranking callers. Tournament play may be provided where the selection of the opposing team and the level of difficulty may be determined by the caller's success in the tournament. Callers may advance from round-robin play, to quarterfinals, semi-finals and grand finals. In the context of an adventure show, callers may be made aware of another caller's choice of role and ability in the show. This caller information may be made available to the other callers in the context of the show, and/or through supplementary media such as on a community web site, or via WAP or SMS messaging. The method of FIG. 17 may be implemented within the context of back-end application 644 (FIG. 6).

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for operating a voice-based interactive entertainment program, the method comprising:

a) receiving a voice communication from at least one user;

b) selecting output in accordance with a voice-based interactive entertainment program, programmed with a plurality of interacting autonomous virtual performers, said autonomous virtual performers comprising software components programmed in accordance with an autonomous intelligent agent architecture characterized by a set of behavior rules, behavior history and personality attributes providing a spontaneity of response of the autonomous virtual performer responsive to said received user voice communication and responsive to other autonomous virtual performers, to produce said output;

c) presenting said output to said user;

d) prompting said user for input at a plot point of said voice-based interactive entertainment program;

e) receiving said input from said user;

f) selecting output at least partly in accordance with said voice-based interactive entertainment program and said input;

g) presenting to said user said output selected in step f).

2. A method according to claim 1 further comprising performing steps d) through g) a plurality of times for a plurality of plot points of said voice-based interactive entertainment program.

3. A method according to claim 1 wherein said selecting step f) comprises: applying decision logic to said input, thereby determining a state of said voice-based interactive entertainment program; and selecting said output at least in part according to a predetermined association with said state.

4. A method according to claim 1 wherein either of said receiving steps comprises receiving voice input.

5. A method according to claim 1 wherein either of said receiving steps further comprises receiving text-based input.

6. A method according to claim 1 wherein either of said selecting and presenting steps further comprises selecting and presenting text-based output.

7. A method according to claim 1 and further comprising maintaining a history of said user inputs, and wherein said selecting step f) comprises selecting output at least in part in accordance with said history.

8. A method according to claim 1, wherein each of said autonomous virtual performers is characterized by a set of programmable personality attributes, and is programmed to evaluate a set of programmable rules, and access a shared a set of programmable attributes common to all peers of autonomous virtual performers, and on its own initiative and spontaneously, react to input and events from users, other autonomous virtual performers and other sources.

9. A method according to claim 8, wherein said programmable attributes include attributes characteristic of personality such as mood and emotion.

10. A method according to claim 8, wherein said programmable rules include logic expressions as conditions in the said attributes.

11. A method according to claim 8, wherein said programmable rules include evaluation of methods provided in the Java language.

12. A method according to claim 1, wherein said voice-based interactive entertainment program comprises a virtual theater.

13. A method according to claim 1, further comprising operating a game engine wherein said game engine: maintains a plurality of autonomous virtual performers; evaluates flow scripts; maintains game state as a set of programmable attributes; exchanges semantic messages; accepts input; and produces output as bubbles.

14. A method according to claim 13, wherein said game engine applies decision logic in accordance with a rule structure of a given game.

15. A method according to claim 13, wherein said game engine applies decision logic in accordance with a predetermined outcome probability.

16. A method according to claim 1, further comprising conducting said voice-based interactive entertainment program for each of a plurality of users with one or more users participating simultaneously; recording a history of the interaction of each of said users with said voice-based interactive entertainment program; and providing access to said histories to any of said users.

17. A method according to claim 16, further comprising ranking said users according to a characteristic of said user's interaction with said voice-based interactive entertainment program.

18. A method according to claim 1 wherein any of said steps are performed for a plurality of users with one or more users participating simultaneously within the context of said voice-based interactive entertainment program.

19. A method according to claim 1, wherein said autonomous virtual performers construct output as phrases from pre-recorded variants of speech elements, the method comprising:

a) selecting a pre-recorded variant of a first speech element from a group of pre-recorded variants of said first speech element;

b) selecting a pre-recorded variant of a second speech element from a group of pre-recorded variants of said second speech element; and c) constructing a phrase from said selected variants.

20. A method according to claim 19, wherein said selecting step b) comprises selecting a second speech element which associatively follows said first speech element.

21. A method according to claim 12, wherein any of said selecting steps comprises selecting any of said variants at least in part according to a predetermined association of a relationship between an autonomous virtual performer and a user.

22. A method according to claim 19, comprising: a first group of pre-recorded variants of speech elements; and a second group of pre-recorded variants of speech elements, wherein said second group associatively follows said first group.

23. A method according to claim 12, wherein said virtual theater comprises of a plurality of autonomous virtual performers; a flow script describing a plurality of plot points; a stage manager; and a virtual stage.

24. A method according to claim 12, wherein said virtual theater further comprises a set of behavior rules and a behavior history.

25. A method according to claim 12, wherein said virtual theater operates said entertainment programs according to multiple genres.

26. A method according to claim 23, wherein said flow script for said voice-based interactive entertainment program comprises a plurality of plot points;

a plurality of transitions between said plot points;

a plurality of rules for determining movement between said plot points and said transitions; and a plurality of output directives associated with any of said plot points and said transitions.

27. A method according to claim 1 wherein said voice communication is processed as input and said output is generated by means of submitting a request to a controller, said request representing interpreted input from a user; wherein said controller:

a) retrieves information from a presentation layer relevant to said input and pops a session context from a presentation layer stack;

b) retrieves a list of post-tasks of a previous action and performs said post-tasks;

c) pushes a new session context onto said presentation layer stack;

d) retrieves a list of pre-tasks;

e) performs said pre-tasks; and f) renders output via a scripted template subsequent to performing any of said tasks.

28. A voice-based interactive entertainment system comprising an interface operative to interface with a user;

a speech/voice processing means operative with said interface to receive input from said user;

presentation means operative to said interface with said speech/voice processing means and to prepare output at least partly based on said input; and a game engine operative to interface with said presentation means and to operate at least one autonomous virtual performer in accordance with a flow script, each autonomous virtual performer comprising software components programmed in accordance with an autonomous intelligent agent architecture characterized by a set of behavior rules, behavior history and personality attributes providing a spontaneity of response of the autonomous virtual performer responsive to said received user voice communication and responsive to other autonomous virtual performers, to produce said output.

29. A voice-based interactive entertainment system comprising:

a) an interface operative to interface with a user;

b) speech/voice processing means operative with said interface and comprising a speech processor operative to perform automatic speech recognition on speech input received from said user;

c) a template module for facilitating input and output via templates;

d) a playout module for producing output to said user;

e) presentation means operative to interface with said speech/voice processing means and comprising means for preparing flow script bubbles for output via said playout module;

f) means for maintaining game state information;

g) means for populating pre-defined templates with links to content in predetermined association with said bubbles and said call state; and h) a game engine operative to interface with said presentation means and including:

i. means for processing a flow script; means for operating software agents representing autonomous virtual performers in accordance with said flow script each autonomous virtual performer comprising software components programmed in accordance with an autonomous intelligent agent architecture characterized by a set of behavior rules, behavior history and personality attributes providing a spontaneity of response of the autonomous virtual performer responsive to said received user voice communication and responsive to other autonomous virtual performers, to produce said output; and ii. data storage means accessible to said game engine for storing and retrieving any of game variables, user profile information, statistics, language models and behavior information in association with the processing of said flow script.

30. A voice-based interactive entertainment system comprising:

a) means for receiving a voice communication from at least one user;

b) means for selecting output in accordance with a voice-based interactive entertainment program, programmed with a plurality of interacting autonomous virtual performers, each autonomous virtual performer comprising software components programmed in accordance with an autonomous intelligent agent architecture characterized by a set of behavior rules, behavior history and personality attributes providing a spontaneity of response of the autonomous virtual performer responsive to said received user voice communication and responsive to other autonomous virtual performers, to produce said output;

c) means for presenting said output to said user;

d) means for prompting said user to provide input at a plot point of said voice-based interactive entertainment program;

e) means for receiving said input from said user;

f) means for selecting output at least partly in accordance with said voice-based interactive entertainment program and said input; and g) means for presenting to said user said output selected in step f).

31. A system according to claim 30, wherein said means for selecting f) comprises: means for applying decision logic to said input, thereby determining a state of said voice-based interactive entertainment program; and means for selecting said output at least in part according to a predetermined association with said state.

32. A system according to claim 30, wherein any of said means for receiving are operative to receive voice-based input.

33. A system according to claim 30, wherein any of said means for receiving are operative to receive text-based input.

34. A system according to claim 30, wherein any of said means for selecting and presenting are operative to select and present text-based input.

35. A system according to claim 30, further comprising means for maintaining a history of said user inputs, and wherein said means for selecting f) is operative to select output at least in part in accordance with said history.

36. A system according to claim 30, further comprising a plurality of virtual performers operative to determine a state of said voice-based interactive entertainment program and to select at least part of said output according to a predetermined association with said state.

37. A system according to claim 30, further comprising a game engine operative to apply decision logic to said input, thereby determining a state of said voice-based interactive entertainment program; and to select said output at least in part according to a predetermined association with said state.

38. A system according to claim 37, wherein said game engine is operative to apply said decision logic in accordance with a rule structure of a game.

39. A system according to claim 37, wherein said game engine is operative to apply said decision logic in accordance with a predetermined outcome probability.

40. A system according to claim 30 further comprising means for conducting said voice-based interactive entertainment program for each of a plurality of users with one or more users participating simultaneously; means for recording a history of the interaction of each of said users with said voice-based interactive entertainment program; and means for providing access to said histories to any of said users.

41. A system according to claim 40, further comprising means for ranking said users according to a characteristic of said user's interaction with said voice-based interactive entertainment program.

42. A system according to claim 40 wherein any of said means are operative for a plurality of users with one or more users participating simultaneously within the context of said voice-based interactive entertainment program.

* * * * *